United States Patent
Senda et al.

(10) Patent No.: US 11,492,438 B2
(45) Date of Patent: Nov. 8, 2022

(54) BLOCK COPOLYMER HYDROGENATE, RESIN COMPOSITION, AND VARIOUS APPLICATIONS THEREOF

(71) Applicant: KURARAY CO., LTD., Kurashiki (JP)

(72) Inventors: Yasushi Senda, Kamisu (JP); Masahiro Kato, Kamisu (JP); Mikio Masuda, Kamisu (JP)

(73) Assignee: KURARAY CO., LTD., Kurashiki (JP)

( * ) Notice: Subject to any disclaimer, the term of this patent is extended or adjusted under 35 U.S.C. 154(b) by 55 days.

(21) Appl. No.: 17/058,940

(22) PCT Filed: May 30, 2019

(86) PCT No.: PCT/JP2019/021485
§ 371 (c)(1),
(2) Date: Nov. 25, 2020

(87) PCT Pub. No.: WO2019/230872
PCT Pub. Date: Dec. 5, 2019

(65) Prior Publication Data
US 2021/0214486 A1    Jul. 15, 2021

(30) Foreign Application Priority Data

May 31, 2018   (JP) .............................. JP2018-105289
Nov. 21, 2018  (JP) .............................. JP2018-218514

(51) Int. Cl.
| | | |
|---|---|---|
| C08F 297/04 | (2006.01) | |
| C08L 53/02 | (2006.01) | |
| C09J 153/02 | (2006.01) | |
| A43B 13/04 | (2006.01) | |
| B32B 27/30 | (2006.01) | |
| C08L 55/02 | (2006.01) | |
| G10K 11/168 | (2006.01) | |
| F16F 3/093 | (2006.01) | |

(52) U.S. Cl.
CPC ............ *C08F 297/04* (2013.01); *A43B 13/04* (2013.01); *B32B 27/302* (2013.01); *C08L 53/02* (2013.01); *C08L 55/02* (2013.01); *C09J 153/02* (2013.01); *G10K 11/168* (2013.01); *F16F 3/093* (2013.01); *F16F 2224/025* (2013.01); *F16F 2228/007* (2013.01)

(58) Field of Classification Search
CPC .... C08L 53/025; C09J 153/025; C08F 297/04
See application file for complete search history.

(56) References Cited

U.S. PATENT DOCUMENTS

| | | | | |
|---|---|---|---|---|
| 4,987,194 A | * | 1/1991 | Maeda ................... | C08L 53/02 |
| | | | | 525/314 |
| 2013/0157069 A1 | * | 6/2013 | Minamide ......... | B32B 17/10018 |
| | | | | 524/505 |
| 2014/0349127 A1 | * | 11/2014 | Minamide ............ | B32B 15/085 |
| | | | | 524/505 |
| 2016/0237277 A1 | | 8/2016 | I et al. | |
| 2018/0215912 A1 | | 8/2018 | Cruz Tejedor et al. | |
| 2019/0077947 A1 | | 3/2019 | Nojima et al. | |
| 2021/0324130 A1 | * | 10/2021 | Kato ..................... | C08F 287/00 |

FOREIGN PATENT DOCUMENTS

| | | |
|---|---|---|
| JP | 2-300250 A | 12/1990 |
| JP | 5-202287 A | 8/1993 |
| JP | 2002-284830 A | 10/2002 |
| WO | WO 2015/156334 A1 | 10/2015 |
| WO | WO 2017/016975 A1 | 2/2017 |
| WO | WO 2017/073695 A1 | 5/2017 |
| WO | WO 2017/159800 A1 | 9/2017 |
| WO | WO 2018/150882 A1 | 8/2018 |
| WO | WO 2019/230527 | * 12/2019 |

OTHER PUBLICATIONS

International Search Report dated Sep. 3, 2019 in PCT/JP2019/021485 filed on May 30, 2019, 2 pages.

Extended European Search Report dated Feb. 22, 2022 in European Patent Application No. 19811093.4, 7 pages.

* cited by examiner

*Primary Examiner* — Jeffrey C Mullis

(74) *Attorney, Agent, or Firm* — Oblon, McClelland, Maier & Neustadt, L.L.P.

(57) ABSTRACT

A block copolymer including a polymer block (A) containing more than 70 mol % of a unit derived from an aromatic vinyl compound, and a polymer block (B) containing 30 mol % or more of a unit derived from a conjugated diene compound is provided. The block copolymer satisfies the conditions: (1): a content of the polymer block (A) in the block copolymer is 1 to 70% by mass; (2): a maximum width of a series of temperature regions where tan δ measured in accordance with JIS K7244-10 (2005), under conditions including a strain amount of 0.1%, a frequency of 1 a measurement temperature of −70 to 100° C., and a temperature rise rate of 3° C./min, is 1.0 or more is less than 16° C.; (3): a temperature at a peak position of tan δ in the condition (2) is 0° C. to +50° C.; and (4): a mobility parameter M indicating a mobility of the polymer block (B) is 0.01 to 0.25 sec.

14 Claims, 2 Drawing Sheets

BLOCK COPOLYMER HYDROGENATE, RESIN COMPOSITION, AND VARIOUS APPLICATIONS THEREOF

TECHNICAL FIELD

The present invention relates to a hydrogenated product of a block copolymer and a resin composition containing the same. Further, the present invention relates to various applications of the hydrogenated product of the block copolymer and the resin composition.

BACKGROUND ART

In some cases, a block copolymer having a polymer block containing a structural unit derived from an aromatic vinyl compound and a polymer block containing a structural unit derived from a conjugated diene compound, especially, a hydrogenated product thereof, in which the structural unit derived from the conjugated diene compound has vinyl bond units (for example, 1,2-bond units and 3,4-bond units), is used as a vibration damping material, and then it is generally known that loss tangent (tan δ) measured in accordance with JIS K7244-10 becomes an indicator of vibration damping.

Until now, it has been known that for the purpose of providing a vibration damping material excellent in mechanical strength, heat resistance, oil resistance or the like, as components contained in a resin composition, (a) a predetermined amount of a thermoplastic resin having a specific polar group in the molecular chain, and (b) a predetermined amount of a block copolymer having a predetermined number average molecular weight or a hydrogenated product thereof, which is constituted by a block (A) having a predetermined number average molecular weight and a block (B) having a predetermined number average molecular weight are blended (see PTL 1). The block (A) is composed of at least one vinyl aromatic monomer. The block (B) is composed of isoprene, butadiene, or isoprene-butadiene, in which an amount of vinyl bonds (the content of 1,2-bond units and 3,4-bond units) is 30% or more. PTL 1 discloses that a case where the content of vinyl bonds in the block copolymer is less than 30% is not preferred because a sufficient vibration damping performance is not obtained in the normal operating temperature region.

In addition, for the purpose of providing a block copolymer that is excellent in vibration damping in a high temperature portion, and has high fluidity and excellent moldability, a block copolymer having a predetermined number average molecular weight has been known, which is constituted by a polymer block A having a predetermined number average molecular weight and a polymer block B having a predetermined number average molecular weight, and has a main dispersion peak of tan δ above 30° C. (see PTL 2). The polymer block A is composed of an aromatic vinyl monomer. The polymer block B is composed of a mixture of isoprene and styrene, in which the amount of vinyl bonds in the isoprene unit is 30 to 60% of all isoprene units. The form of the polymer blocks A and B is represented by A-(B-A)n or (A-B)n. In PTL 2, isoprene and styrene are used in combination as a monomer component forming the polymer block B, and also the content of 3,4-bond units and 1,2-bond units of the isoprene unit falls within a range of 30% to 60% of all isoprene units, so that it is possible to set the main dispersion peak of tan δ to 30° C. or more. Thus, it is thought that the vibration damping performance in a temperature portion higher than room temperature is improved. In addition, from the viewpoint of maintaining the vibration damping performance at a high temperature, the purport in the description of PTL 2 is that the content of 3,4-bond units and 1,2-bond units of the isoprene unit in the polymer block B has to fall within a range of 30% to 60% of all isoprene units.

Further, PTL 3 describes a liquid-packaging container composed of a laminate containing a resin composition that contains a thermoplastic elastomer (2). The thermoplastic elastomer is obtained by hydrogenating a block copolymer that has a polymer block (A) and a polymer block (B). The polymer block (A) is mainly composed of a structural unit derived from an aromatic vinyl compound. The polymer block (B) is mainly composed of a structural unit derived from a conjugated diene compound, in which the content of a vinyl bond structural unit is 50 mol % or more, and 80 mol % or more of carbon-carbon double bonds included in the polymer block (B) are hydrogenated. Meanwhile, there is no detailed description on what kind of thermoplastic elastomer exhibits a high vibration damping property.

CITATION LIST

Patent Literature

PTL 1: JP H5-202287 A
PTL 2: JP 2002-284830 A
PTL 3: WO 2015/156334 A

SUMMARY OF INVENTION

Technical Problem

The vibration damping material includes a "restraint type" in which the vibration damping material is disposed between a base material and a restraining plate, and a "non-restraint type" in which the vibration damping material is attached to only one surface of the base material. In the former, since both surfaces of the vibration damping material are fixed, vibration energy is absorbed by using correlation shift (shear strain) occurring by deformation caused by vibration stress. In the latter, vibration energy is absorbed by using the expansion and contraction of the vibration damping material which occur by a change of the base material due to vibration stress. In general, the non-restraint type vibration damping material that is effective only by being attached to a member is easier to handle than the restraint type vibration damping material that requires the use of the restraining plate, and thus is widely used.

FIG. 1 is a schematic sectional view of laminates including vibration damping materials. FIG. 1(A) illustrates a laminate 100 as a restraint type vibration damping material, and FIG. 1(B) illustrates a laminate 200 as a non-restraint type vibration damping material. As illustrated in FIG. 1(A), in the laminate 100, a vibration damping material 13 is disposed between a restraining plate 11 and a base material 12. As illustrated in FIG. 1(B), in the laminate 200, a vibration damping material 23 is disposed on one side surface of a base material 22. As illustrated in FIG. 1(A), the restraint type vibration damping material is subjected to shear stress in a plane direction on the basis of a misalignment when two members are deformed, whereas in the non-restraint type vibration damping material, such stress is unlikely to occur, and vibration energy is absorbed by expansion and contraction caused by deformation of the base material. As described above, since the restraint type vibration damping material and the non-restraint type vibration damping material have different vibration absorbing mechanisms, it is originally appropriate to impart a suitable performance to each.

However, in a conventional aromatic vinyl-based elastomer intended to be used as a vibration damping material, in an actual status, studies focusing on these two types have not been sufficiently conducted. For example, in some cases, even a styrene-based elastomer capable of exhibiting a vibration damping property required for the restraint type vibration damping material may not sufficiently exhibit the vibration damping property when used for the non-restraint type vibration damping material.

Therefore, an object of the present invention is to provide a block copolymer, as a non-restraint type vibration damping material, which exhibits a high vibration damping property in a wide temperature range, and a resin composition. The block copolymer has a polymer block (A) containing a structural unit derived from an aromatic vinyl compound, and a polymer block (B) containing a structural unit derived from a conjugated diene compound.

Solution to Problem

The present inventors have found that a high vibration damping property is exhibited when a block copolymer having a specific configuration, which uses a block copolymer whose tan δ is 1.0 or more in a relatively narrow temperature region in regard to a characteristic curve indicating a change of tan δ with respect to a temperature, is used as a non-restraint type vibration damping material, and thus the above problem may be solved, and have completed the present invention.

The present invention relates to followings [1] to [15].

[1] A block copolymer including: a polymer block (A) containing more than 70 mol % of a structural unit derived from an aromatic vinyl compound, and a polymer block (B) containing 30 mol % or more of a structural unit derived from a conjugated diene compound, the block copolymer further satisfying following conditions:

Condition (1): a content of the polymer block (A) in the block copolymer is from 1 to 70% by mass, Condition (2): a maximum width of a series of temperature regions where tan δ measured in accordance with JIS K7244-10 (2005), under conditions including a strain amount of 0.1%, a frequency of 1 Hz, a measurement temperature of −70 to 100° C., and a temperature rise rate of 3° C./min, is 1.0 or more is less than 16° C., Condition (3): a temperature at a peak position of tan δ in the condition (2) falls within a range of 0° C. to +50° C., and Condition (4): a mobility parameter M indicating a mobility of the polymer block (B) falls within a range of 0.01 to 0.25 sec, which is obtained through the following equation [II] by using coefficients $A_1$ to $A_3$ and spin-spin relaxation times $\tau_1$ to $\tau_3$ of components which are determined by performing fitting of the following equation [I], in regard to a relaxation curve which is represented by a relaxation intensity y with respect to a relaxation time x, and measured using a pulse NMR apparatus:

$$y = A_1 * \exp(-0.5*(x/\tau_1)^2) + A_2 * \exp(-0.5(x/\tau_2)^2) + A_3 * \exp(-x/\tau_3)$$ [I], and $$M = (\tau_2 * A_2 + \tau_3 * A_3)/(A_2 + A_3)$$ [II].

[2] The block copolymer described in [1], wherein the block copolymer is a hydrogenated product, and a hydrogenation rate of the polymer block (B) is 60 mol % or more.

[3] The block copolymer described in [1] or [2], wherein a sum of a content of 1,2-bond units and a content of 3,4-bond units in the structural unit derived from the conjugated diene compound is 60 mol % or more.

[4] The block copolymer described in any one of [1] to [3], wherein the conjugated diene compound contains isoprene.

[5] The block copolymer described in any one of [1] to [4], wherein the polymer block (B) does not contain the structural unit derived from an aromatic vinyl compound.

[6] The block copolymer described in any one of [1] to [5], wherein the content of the block derived from the aromatic vinyl compound is from 15 to 65% by mass.

[7] The block copolymer described in any one of [1] to [6], wherein a loss modulus G" at 10° C. or 30° C., which is measured in accordance with JIS K7244-10 (2005) under conditions including a strain amount of 0.1%, a frequency of 1 Hz, a measurement temperature of −70 to 100° C., and a temperature rise rate of 3° C./min, is $7.0 \times 10^6$ Pa or more.

[8] A resin composition containing (L) the block copolymer described in any one of [1] to [7], and (M) one or more selected from a polyolefin-based resin, a styrene-based resin, polyphenylene ether, an isobutylene-isoprene copolymer rubber, a polyurethane-based thermoplastic elastomer, polycarbonate, and polyamide, wherein a content ratio [(L)/(M)] of the (L) component and the (M) component is 1/99 to 99/1 by a mass ratio.

[9] A molded body obtained by molding the block copolymer described in any one of [1] to [7] or the resin composition described in [8].

[10] A vibration damping material containing the block copolymer described in any one of [1] to [7] or the resin composition described in [8].

[11] A sound insulating material containing the block copolymer described in any one of [1] to [7] or the resin composition described in [8].

[12] A shoe sole material containing the block copolymer described in any one of [1] to [7] or the resin composition described in [8].

[13] A flooring material containing the block copolymer described in any one of [1] to [7] or the resin composition described in [8].

[14] An adhesive or a sticking agent containing the block copolymer described in any one of [1] to [7] or the resin composition described in [8].

[15] A laminate having an X layer containing the block copolymer described in any one of [1] to [7] or the resin composition described in [8], and a Y layer laminated on one side surface of the X layer.

Advantageous Effects of Invention

According to the present invention, it is possible to provide a block copolymer, as a non-restraint type vibration damping material, which exhibits a high vibration damping property in a wide temperature range, and a resin composition. The block copolymer has a polymer block (A) containing a structural unit derived from an aromatic vinyl compound, and a polymer block (B) containing a structural unit derived from a conjugated diene compound.

BRIEF DESCRIPTION OF DRAWINGS

FIG. 1(A) illustrates a laminate having a restraint type vibration damping material, and FIG. 1(B) illustrates a laminate having a non-restraint type vibration damping material.

FIG. 4(A) illustrates the correlation between the loss factor in the non-restraint type at 20° C. and the loss modulus G" at 10° C., and FIG. 4(B) illustrates the correlation between the loss factor in the non-restraint type at 40° C. and the loss modulus G" at 30° C.

DESCRIPTION OF EMBODIMENTS

Figure 1:
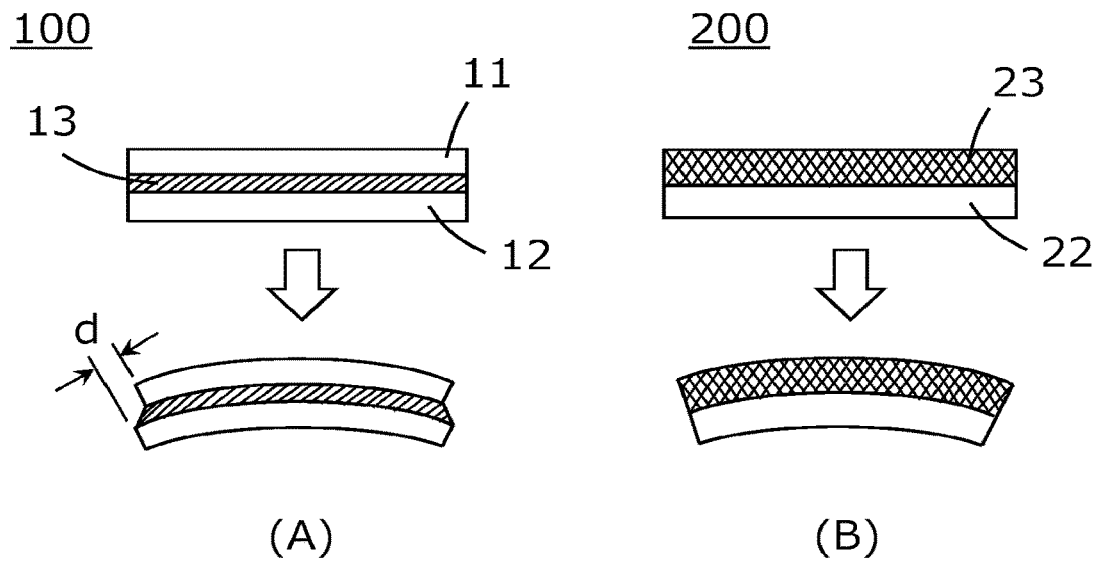
FIG. 1 is a schematic sectional view of laminates including vibration damping materials.

Hereinafter, an embodiment of the present invention will be described. The present invention also includes aspects in which items described in this specification are arbitrarily selected or arbitrarily combined.
[Block Copolymer]

A block copolymer related to the present invention is a block copolymer including a polymer block (A) containing more than 70 mol % of a structural unit derived from an aromatic vinyl compound, and a polymer block (B) containing 30 mol % or more of a structural unit derived from a conjugated diene compound, the block copolymer further satisfying the following conditions.

Condition (1): The content of the polymer block (A) in the block copolymer is 1 to 70% by mass.

Condition (2): A maximum width of a series of temperature regions where tan δ measured in accordance with JIS K7244-10 (2005), under conditions including a strain amount of 0.1%, a frequency of 1 Hz, a measurement temperature of −70 to 100° C., and a temperature rise rate of 3° C./min, is 1.0 or more is less than 16° C.

Condition (3): A temperature at a peak position of tan δ in the condition (2) is 0° C. to +50° C.

Condition (4): In regard to a relaxation curve which is measured using a pulse NMR apparatus, and is represented by a relaxation intensity y with respect to a relaxation time x, when coefficients $A_1$ to $A_3$ and spin-spin relaxation times $\tau_1$ to $\tau_3$ of components are determined by performing fitting using the following equation [I], a mobility parameter M that indicates the mobility of the polymer block (B) and is obtained through the following equation [II] is 0.01 to 0.25 sec.

$$y = A_1 * \exp(-0.5*(x/\tau_1)^2) + A_2 * \exp(-0.5(x/\tau_2)^2) + A_3 * \exp(-x/\tau_3) \quad [\text{I}]$$

$$M = (\tau_2 * A_2 + \tau_3 * A_3)/(A_2 + A_3) \quad [\text{II}]$$

The vibration damping property of a vibration damping material is generally good when tan δ of the vibration damping material is 1.0 or more at a temperature for the use. Meanwhile, the block copolymer of the present invention satisfies the condition (2), while a peak of tan δ is allowed to be present at a relatively high temperature region on a characteristic curve (hereinafter, referred to as a temperature characteristic curve of tan δ) indicating a change of tan δ with respect to a temperature. Then, the degree of freedom in material selection is increased so that a block polymer suitable for a vibration damping material to be used for a non-restraint type vibration damping material is selected.

That is, a material that seems not to be suitable for securing a vibration damping property in a wide temperature range, in which a series of temperature regions where tan δ is 1 or more is narrow on the temperature characteristic curve of tan δ, is intentionally used. For example, by increasing the content of the polymer block having a structural unit derived from an aromatic vinyl compound, in the block copolymer, the temperature characteristic curve of tan δ is shifted, as a whole, downward, and then a series of temperature ranges where tan δ≥1 is reduced.

Meanwhile, regarding the non-restraint type vibration damping material in which the vibration damping material is attached to only one surface of a base material, the present inventors have found that a loss modulus G" has a stronger correlation with a vibration damping property than tan δ of the block copolymer. As described above, for example, when the content of the polymer block having a structural unit derived from an aromatic vinyl compound, in the block copolymer increases, the loss modulus G" of the block copolymer tends to be increased. Therefore, for example, by increasing the content of the polymer block having the structural unit derived from the aromatic vinyl compound, in the block copolymer, the loss modulus G" is kept large in a relatively wide temperature range. Also, by satisfying the condition (3) and the condition (4), it is possible to secure a vibration damping property sufficient for the non-restraint type vibration damping material even at a relatively high temperature.

The block copolymer of the present invention satisfies the conditions (1) to (4) from the viewpoint to keep the loss modulus G" large even at a relatively high temperature, and to make the vibration damping property sufficient for the non-restraint type vibration damping material. The block copolymer of the present invention is appropriate for a vibration damping material used for a non-restraint type laminate having the configuration represented by FIG. 1(B). Details of the conditions (1) to (4) will be described below.

Next, detailed descriptions will be made on constituent elements of the block copolymer of the present invention, physical properties of the block copolymer, a method of producing the block copolymer, and the like.

The block copolymer of the present invention is a block copolymer having the polymer block (A) and the polymer block (B), preferably, a hydrogenated product of the block copolymer. In this specification, the hydrogenated product of the block copolymer may also be referred as a hydrogenated block copolymer.
(Polymer Block (A))

In the polymer block (A), the content of a structural unit derived from an aromatic vinyl compound (hereinafter, also abbreviated as an "aromatic vinyl compound unit") exceeds 70 mol %, and from the viewpoint of mechanical properties, may be preferably 80 mol % or more, more preferably 85 mol % or more, further preferably 90 mol % or more, particularly preferably 95 mol % or more, substantially 100 mol %.

Examples of the aromatic vinyl compound include styrene, o-methyl styrene, m-methyl styrene, p-methyl styrene, α-methyl styrene, β-methyl styrene, 2,6-dimethyl styrene, 2,4-dimethyl styrene, α-methyl-o-methyl styrene, α-methyl-m-methyl styrene, α-methyl-p-methyl styrene, β-methyl-o-methyl styrene, β-methyl-m-methyl styrene, β-methyl-p-methyl styrene, 2,4,6-trimethyl styrene, α-methyl-2,6-dimethyl styrene, α-methyl-2,4-dimethyl styrene, β-methyl-2,6-dimethyl styrene, β-methyl-2,4-dimethyl styrene, o-chlorostyrene, m-chlorostyrene, p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-t-butyl styrene, m-t-butyl styrene, p-t-butyl styrene, o-methoxy styrene, m-methoxy styrene, p-methoxy styrene, o-chloromethyl styrene, m-chloromethyl styrene, p-chloromethyl styrene, o-bromomethyl styrene, m-bromomethyl styrene, p-bromomethyl styrene, a styrene derivative substituted with a silyl group, indene, and vinyl naphthalene. One of these aromatic vinyl compounds may be used alone or two or more thereof may be used. Among them, from the viewpoint of a production cost and a physical property balance, styrene, α-methyl styrene, p-methyl styrene, and a mixture thereof are preferred, and styrene is more preferred.

Meanwhile, as long as the object and effects of the present invention are not disturbed, the polymer block (A) may contain a structural unit derived from an unsaturated monomer other than the aromatic vinyl compound (hereinafter, also abbreviated as "another unsaturated monomer unit") at a ratio of less than 30 mol %. Examples of the other unsaturated monomer include at least one type selected from the group including butadiene, isoprene, 2,3-dimethyl butadiene, 1,3-pentadiene, 1,3-hexadiene, isobutylene, methyl methacrylate, methyl vinyl ether, N-vinyl carbazole, β-pinene, 8,9-p-mentene, dipentene, methylene norbornene, and 2-methylene tetrahydrofuran. The bonding form in the case where the polymer block (A) contains the other unsaturated monomer unit is not particularly limited, and may be any one of random and tapered forms.

In the polymer block (A), the content of the structural unit derived from the other unsaturated monomer is preferably 10 mol % or less, more preferably 5 mol % or less, further preferably 0 mol %.

The block copolymer may have at least one polymer block (A). When the block copolymer has two or more polymer blocks (A), these polymer blocks (A) may be the same or different. In this specification, "polymer blocks are different" means that they are different in at least one of a monomer unit constituting a polymer block, a weight average molecular weight, a stereoregularity, and in a ratio of each monomer unit and a copolymerization form (random, gradient, or block) in a case where a plurality of monomer units is included.

In the present invention, it is desirable that the block copolymer has two polymer blocks (A).

The weight average molecular weight (Mw) of the polymer block (A) included in the block copolymer is not particularly limited, but the weight average molecular weight of at least one polymer block (A) among the polymer blocks (A) included in the block copolymer is preferably 3,000 to 60,000, more preferably 4,000 to 50,000. When the block copolymer has at least one polymer block (A) having a weight average molecular weight within the above range, the mechanical strength is further improved, and film moldability is also excellent. From the viewpoint of improving compressed permanent distortion, the weight average molecular weight of at least one polymer block (A) among the polymer blocks (A) included in the block copolymer is preferably 20,000 to 50,000, more preferably 30,000 to 50,000, particularly preferably 40,000 to 50,000.

All the "weight average molecular weights" described in this specification and claims are weight average molecular weights (in terms of standard polystyrene) obtained by gel permeation chromatography (GPC) measurement. The detailed measurement method may follow the method described in Examples. The weight average molecular weight of each polymer block (A) included in the block copolymer may be obtained by measuring a sampled liquid each time polymerization of each polymer block is ended in a production process. In addition, for example, in the case of a triblock copolymer having an A1-B-A2 structure, weight average molecular weights of the first polymer block A1 and the polymer block B are obtained by the above method, and by subtracting these from the weight average molecular weight of the block copolymer, the weight average molecular weight of the second polymer block A2 may be obtained. In addition, in another method, in the case of a triblock copolymer having an A1-B-A2 structure, the total weight average molecular weight of the polymer blocks (A) is calculated from the weight average molecular weight of the block copolymer and the total content of the polymer blocks (A) confirmed by $^1$H-NMR measurement, and the weight average molecular weight of the deactivated first polymer block A1 is calculated by GPC measurement, and then, by subtracting this, the weight average molecular weight of the second polymer block A2 may be obtained.

As described above, the block copolymer of the present invention satisfies the following condition (1).
<Condition (1)>
Condition (1): The content of the polymer block (A) in the block copolymer (in the case where a plurality of polymer blocks (A) is present, a total content of these) is 1 to 70% by mass.

When the content of the polymer block (A) is less than 1% by mass, it becomes difficult to form a pellet of the hydrogenated block copolymer. Meanwhile, when the content exceeds 70% by mass, flexibility and moldability become insufficient. In addition, as the content of the polymer block (A) increases, it becomes easy to increase the loss modulus G" (to be described below) of the block polymer in a wide temperature range, and it becomes easy to have good characteristics for the non-restraint type vibration damping material. From this viewpoint, the content of the polymer block (A) is preferably 10 to 70% by mass, more preferably 15 to 65% by mass, further preferably 16 to 65% by mass, further preferably 20 to 60% by mass, particularly preferably 25 to 55% by mass.

The content of the polymer block (A) in the block copolymer is a value obtained by $^1$H-NMR measurement, and more specifically, a value measured according to the method described in Examples.
(Polymer Block (B))

The polymer block (B) is a polymer block in which the content of a structural unit derived from a conjugated diene compound is 30 mol % or more, preferably 50 mol % or more, more preferably 65 mol % or more, further preferably 80 mol % or more.

The conjugated diene compound preferably contains isoprene. In particular, the content of isoprene is more preferably 20% by mass or more, and the content is further preferably 40% by mass or more. Further, the content may be 70% by mass or more, and the content may be 90% by mass or more.

In the polymer block (B), the content of a structural unit derived from isoprene alone may be 30 mol % or more, and the content of a structural unit derived from two or more types of conjugated diene compounds may be 30 mol % or more.

Examples of the conjugated diene compound include, in addition to isoprene, butadiene, hexadiene, 2,3-dimethyl-1, 3-butadiene, 1,3-pentadiene, and myrcene. As the conjugated diene compound, isoprene, and a mixture of isoprene and butadiene are preferred, and isoprene is more preferred.

When the conjugated diene compound is a mixture of butadiene and isoprene, the mixing ratio thereof [isoprene/butadiene] (mass ratio) is not particularly limited, but is preferably 5/95 to 95/5, more preferably 10/90 to 90/10, further preferably 40/60 to 70/30, particularly preferably 45/55 to 65/35. When expressed in a molar ratio, the mixing ratio [isoprene/butadiene] is preferably 5/95 to 95/5, more preferably 10/90 to 90/10, further preferably 40/60 to 70/30, particularly preferably 45/55 to 55/45.

In addition, when the conjugated diene compound is a mixture of butadiene and isoprene, from the viewpoint of vibration damping, in measurement by $^{13}$C-NMR, the ratio of a peak area present at a chemical shift value of 24 to 25 ppm to a peak area present at a chemical shift value of 5 to 50 ppm, is preferably 4% or less, more preferably 2% or less, further preferably 1% or less, most preferably 0.5% or less. In measurement by $^{13}$C-NMR, peaks present at a chemical shift value of 5 to 50 ppm correspond to all structural units in the polymer block (B), and a peak present at a chemical shift value of 24 to 25 ppm corresponds to a site where the structural unit derived from isoprene is continuous with 1,4-bonds.

In other words, in the polymer block (B), the content of a structural unit derived from isoprene (hereinafter, also abbreviated as an "isoprene unit") is preferably 30 mol % or more, or the content of a structural unit derived from the mixture of isoprene and butadiene (hereinafter, also abbreviated as a "mixture unit of isoprene and butadiene") is preferably 30 mol % or more.

When the polymer block (B) has two or more types of structural units, the bonding form thereof may be made by random-, tapered-, completely alternative-, partial block forms, a block, or a combination of two or more types thereof.

(Amount of Vinyl Bonds in Polymer Block (B))

When the structural unit constituting the polymer block (B) is any one of an isoprene unit, and a mixture unit of isoprene and butadiene, as the bonding form of each of isoprene and butadiene, a 1,2-bond, and a 1,4-bond in the case of butadiene, and a 1,2-bond, a 3,4-bond, and a 1,4-bond in the case of isoprene may be adopted.

In regard to the amount of vinyl bonds in the polymer block (B), it is desirable that the block copolymer of the present invention satisfies the following condition (5).
<Condition (5)>

Condition (5): in the block copolymer, the total content of 3,4-bond units and 1,2-bond units in the polymer block (B) (that is, an amount of vinyl bonds) is 60 mol % or more.

The amount of vinyl bonds is preferably 65 mol % or more, more preferably 67 mol % or more, further preferably 70 mol % or more, still further preferably 72 mol % or more, particularly preferably 75 mol % or more, most preferably 78 mol % or more. In addition, although there is no particular limitation, the upper limit value of the amount of vinyl bonds in the polymer block (B) may be 95 mol %, may be 92 mol %, or may be 90 mol %. Here, the amount of vinyl bonds is a value calculated by $^1$H-NMR measurement according to the method described in Examples.

In addition, from the viewpoint of vibration damping or the like, the total weight average molecular weight of the polymer blocks (B) included in the block copolymer, in a state before hydrogenation, is preferably 15,000 to 800,000, more preferably 20,000 to 400,000, further preferably 20,000 to 300,000, particularly preferably 30,000 to 300,000, most preferably 40,000 to 300,000. From the viewpoint of improving the compressed permanent distortion, the total weight average molecular weight of the polymer blocks (B) included in the block copolymer, in a state before hydrogenation, is preferably 100,000 to 300,000, more preferably 150,000 to 300,000, particularly preferably 200,000 to 300,000.

As long as the object and effects of the present invention are not disturbed, the polymer block (B) may contain a structural unit derived from a polymerizable monomer other than the conjugated diene compound. In this case, in the polymer block (B), the content of the structural unit derived from the polymerizable monomer other than the conjugated diene compound is preferably 70 mol % or less, more preferably 50 mol % or less, further preferably 35 mol % or less, particularly preferably 20 mol % or less. The lower limit value of the content of the structural unit derived from the polymerizable monomer other than the conjugated diene compound is not particularly limited, but may be 0 mol %, may be 5 mol %, or may be 10 mol %.

As the other polymerizable monomer, for example, at least one compound selected from the group consisting of aromatic vinyl compounds, such as styrene, α-methyl styrene, o-methyl styrene, m-methyl styrene, p-methyl styrene, p-t-butyl styrene, 2,4-dimethyl styrene, vinyl naphthalene, and vinyl anthracene, and methyl methacrylate, methyl vinyl ether, N-vinyl carbazole, β-pinene, 8,9-p-mentene, dipentene, methylene norbornene, 2-methylene tetrahydrofuran, 1,3-cyclopentadiene, 1,3-cyclohexadiene, 1,3-cycloheptadiene, and 1,3-cyclooctadiene may be preferably exemplified. Among them, styrene, α-methyl styrene, and p-methyl styrene are preferred, and styrene is more preferred.

When the polymer block (B) contains the structural unit derived from the polymerizable monomer other than the conjugated diene compound, a specific combination thereof preferably includes isoprene and styrene.

When the polymer block (B) contains the structural unit derived from the polymerizable monomer other than the conjugated diene compound, although any one of random and tapered forms may be employed, the bonding form thereof is not particularly limited, and is preferably random.

The block copolymer may have at least one polymer block (B). When the block copolymer has two or more polymer blocks (B), these polymer blocks (B) may be the same or different.

In the present invention, it is desirable that the block copolymer has only one polymer block (B).

In the present invention, it is desirable that the polymer block (B) does not include a structural unit derived from an aromatic vinyl compound. When the polymer block (B) includes the structural unit derived from the aromatic vinyl compound, the peak intensity of the loss modulus G" may be reduced, and the vibration damping property may be reduced in the use as the non-restraint type vibration damping material.

(Bonding Mode of Polymer Block (A) and Polymer Block (B))

In the block copolymer, as long as the polymer block (A) and the polymer block (B) are bonded, the bonding form is not limited, and may be any one of a linear form, a branched form, a radial form, and a bonding mode as a combination of two or more of these. Among them, the bonding form between the polymer block (A), and the polymer block (B) is preferably linear. As an example, for the polymer block (A) represented by A, and the polymer block (B) represented by B, a diblock copolymer represented by A-B, a triblock copolymer represented by A-B-A or B-A-B, a tetra block copolymer represented by A-B-A-B, a pentablock copolymer represented by A-B-A-B-A or B-A-B-A-B, and an (A-B)nX type copolymer (X represents a coupling agent residue, and n represents an integer of 3 or more) may be exemplified. Among them, the triblock copolymer or the diblock copolymer, in the linear form, is preferred, and the A-B-A type triblock copolymer is preferably used from the viewpoint of flexibility, ease of production, and the like.

Here, in this specification, when the same types of polymer blocks are linearly bonded via a bifunctional coupling agent or the like, the bonded polymer blocks are treated as a whole as one polymer block. Accordingly, polymer blocks, including the above examples, which should be originally strictly denoted by Y-X-Y (X represents a coupling residue), are represented by Y as a whole, particularly unless it is necessary to distinguish these from a single polymer block Y. In this specification, since these types of polymer blocks including a coupling agent residue are treated as described above, for example, a block copolymer including a coupling agent residue, which should be strictly denoted by A-B-X-B-A (X represents a coupling agent residue), is denoted by A-B-A, and is treated as an example of a triblock copolymer.

The block copolymer related to the present invention is preferably a hydrogenated product. Then, in regard to the polymer block (B), it is desirable that the block copolymer of the present invention satisfies the following condition (6).
<Condition (6)>
Condition (6): The hydrogenation rate of the polymer block (B) is 60 mol % or more. That is, 60 mol % or more of carbon-carbon double bonds included in the polymer block (B) are hydrogenated.

When the hydrogenation rate of the polymer block (B) is high, a vibration damping property, a heat resistance and a weather resistance are excellent in a wide range of temperatures. From the same viewpoint, the hydrogenation rate of the polymer block (B) is preferably 70 mol % or more, more preferably 80 mol % or more, further preferably 85 mol % or more, particularly preferably 88 mol % or more, most preferably 90 mol % or more. This value may be referred to as a hydrogenation rate. The upper limit value of the hydrogenation rate is not particularly limited, but the upper limit value may be 99 mol %, or may be 98 mol %.

The hydrogenation rate is a value of the content of carbon-carbon double bonds in a structural unit derived from the conjugated diene compound, in the polymer block (B), which is obtained by $^1$H-NMR measurement after hydrogenation, and is more specifically a value measured according to the method described in Examples.
(Weight Average Molecular Weight (Mw) of Hydrogenated Block Copolymer)

The weight average molecular weight (Mw) of the hydrogenated block copolymer, which is determined by gel permeation chromatography in terms of standard polystyrene, is preferably 20,000 to 800,000, more preferably 30,000 to 500,000, further preferably 30,000 to 400,000, further preferably 40,000 to 400,000, further preferably 40,000 to 350,000, particularly preferably 50,000 to 350,000, most preferably 50,000 to 300,000. When the weight average molecular weight of the block copolymer is 20,000 or more, the heat resistance is increased, and at 800,000 or less, the moldability is improved. From the viewpoint of improving the compressed permanent distortion, the weight average molecular weight of the block copolymer is preferably 200,000 to 600,000, more preferably 250,000 to 500,000, particularly preferably 300,000 to 450,000.

As long as the object and effects of the present invention are not disturbed, the block copolymer of the present invention may have one type or two or more types of functional groups, such as a carboxy group, a hydroxy group, an acid anhydride group, an amino group, and an epoxy group, at the chain of a molecule and/or the terminal of a molecule, or may not have any functional group.
(Conditions (2) to (4))

As described above, the block copolymer of the present invention satisfies the following condition (2).
<Condition (2)>
Condition (2): A maximum width of a series of temperature regions where tan δ measured in accordance with JIS K7244-10 (2005), under conditions including a strain amount of 0.1%, a frequency of 1 Hz, a measurement temperature of −70 to 100° C., and a temperature rise rate of 3° C./min, is 1.0 or more is less than 16° C.

Here, the "series of temperature regions where tan δ is 1.0 or more" indicates a continuous temperature range where tan δ is 1.0 or more, that is, tan δ in the temperature range is always 1.0 or more.

For a test piece in the measurement of tan δ, a sheet with a thickness of 1.0 mm is prepared through pressurization by a press-molding device "NF-50T" (manufactured by Shinto Metal Industries Ltd.) at a temperature of 230° C., and a pressure of 10 MPa for 3 min. Then, the sheet is cut into a disk shape with a diameter of 8 mm to obtain a test piece.

In the present invention, a measurement device of tan δ is not particularly limited, but a rotary rheometer "ARES-G2" (manufactured by TA instruments) or the like may be used for a test while the test piece is placed between flat plates with a diameter of 8 mm.

Satisfying the condition (2) makes it easy to increase the loss modulus G" in a wide temperature range. As a result, when the block copolymer is used as the non-restraint type vibration damping material, an excellent vibration damping property may be provided.

The maximum width of the temperature regions is preferably 15° C. or less, more preferably 14° C. or less, further preferably 13° C. or less, particularly preferably 12° C. or less. In addition, the maximum width may be 0° C., that is, tan δ may be less than 1.0 in a range of all temperatures, and "a series of temperature regions where tan δ is 1.0 or more" may not be present. In addition, when "a series of temperature regions where tan δ is 1.0 or more" is present, the lower limit value of the maximum width in the temperature regions may be 1° C., may be 2° C., or may be 3° C.

In satisfying the condition (2), for example, increasing the content of the polymer block (A) including a structural unit derived from the aromatic vinyl compound may be exemplified.

In addition, as described above, the block copolymer of the present invention satisfies the following condition (3).
<Condition (3)>
Condition (3): tan δ measured in accordance with JIS K7244-10 (2005), under conditions including a strain amount of 0.1%, a frequency of 1 Hz, a measurement temperature of −70 to 100° C., and a temperature rise rate of 3° C./min, has a peak, and the temperature at the peak position is 0° C. to +50° C.

When the peak position of tan δ is present at a higher temperature side, the block copolymer is generally excellent in vibration damping at a high temperature, and satisfies the condition (3). Thus, in a wide temperature region covering a temperature region that is actually used, it becomes easy to improve the vibration damping property.

The description for the test piece for measuring tan δ is the same as the description in the condition (2).

The temperature at the peak position of tan δ is preferably 0° C. to +45° C., more preferably 5° C. to +45° C., further preferably +5° to +40° C., particularly preferably +10° C. to +40° C.

In satisfying the condition (3), for example, using isoprene as a monomer that constitutes a structural unit derived from the conjugated diene compound may be exemplified.

In addition, as described above, the block copolymer of the present invention satisfies the following condition (4).
<Condition (4)>

Condition (4): The value of a mobility parameter M indicating the mobility of the polymer block (B) is 0.01 to 0.25 sec, which is obtained through the following equation [II] by using coefficients $A_1$ to $A_3$ and spin-spin relaxation times $\tau_1$ to $\tau_3$ of components which are determined by performing fitting of the following equation [I], in regard to a relaxation curve which is represented by a relaxation intensity y with respect to a relaxation time x, and measured using a pulse NMR apparatus.

$$y=A_1*\exp(-0.5*(x/\tau_1)^2)+A_2*\exp(-0.5(x/\tau_2)^2)+A_3*\exp(-x/\tau_3) \quad [I]$$

$$M=(\tau_2*A_2+\tau_3*A_3)/(A_2+A_3) \quad [II]$$

In the relaxation curve, relaxation curves derived from a total of three components (one component with relatively low mobility and two components with relatively high mobility) are overlapping. By fitting the relaxation curve by using the equation [I] through a least square method, three relaxation curves derived from the components, respectively, may be obtained.

The first term of the equation [I] is derived from relaxation of the relatively low mobility component, and the second term and the third term are derived from relaxation of the relatively high mobility components. In addition, A1 corresponds to a proportion of the relatively low mobility component, and A2 and A3 correspond to proportions of the relatively high mobility components. The mobility parameter M indicates the slope of relaxation derived from the polymer block (B) when the behavior of the block copolymer is measured by pulse NMR, and is an index indicating mobility mainly derived from conjugated diene. When a pulse of a predetermined frequency is applied to the block copolymer by using pulse NMR, relaxation derived from the polymer block (A) as the relatively low mobility component occurs immediately after start of relaxation, and then, relaxation derived from the polymer block (B) as the relatively high mobility component occurs. By using this phenomenon, physical properties of the polymer block (B) may be measured, and by obtaining the mobility parameter M through the procedure, the behavior of relaxation derived from the polymer block (B) may be evaluated.

When the mobility parameter M takes an appropriate value, the vibration in the temperature region that is actually used is effectively relaxed, and the vibration damping property is allowed to be improved.

The mobility parameter M is preferably 0.015 to 0.23 sec, more preferably 0.02 to 0.20 sec, further preferably 0.025 to 0.18 sec.

In order to adjust the value of the mobility parameter M, for example, the amount of a vinyl agent to be added may be adjusted. When the amount of the vinyl agent is increased, it becomes easy to increase the value of the mobility parameter M, and when the amount of the vinyl agent is decreased, it becomes easy to decrease the value of the mobility parameter M. In order to satisfy the condition (4), for example, isoprene may be used as a monomer that constitutes a structural unit derived from the conjugated diene compound.

(Other Conditions)

Although there is no particular limitation, from the viewpoint of exhibiting a more excellent vibration damping property for the non-restraint type vibration damping material, it is desirable that the block copolymer of the present invention further satisfies the following condition (7).
<Condition (7)>

Condition (7): A loss modulus G" at 10° C. or 30° C., which is measured in accordance with JIS K7244-10 (2005) under conditions including a strain amount of 0.1%, a frequency of 1 Hz, a measurement temperature of −70 to 100° C., and a temperature rise rate of 3° C./min, is $7.0 \times 10^6$ Pa or more.

According to the studies of the present inventors, there is a linear correlation between the loss factor in the non-restraint type vibration damping material and the loss modulus G", and it has been turned out that the larger the loss modulus G", the larger the loss factor in the non-restraint type. In particular, the present inventors have found that the loss modulus G" at 10° C. and 1 Hz and the loss modulus G" at 30° C., and 1 Hz in the non-restraint type correlate with the loss factor at 20° C. and 1 Hz, and the loss factor at 40° C. and 1 Hz, respectively. Then, it has been found that when at least one of the loss modulus G" at 10° C. and 1 Hz, and the loss modulus G" at 30° C. and 1 Hz in the non-restraint type is $7.0 \times 10^6$ Pa or more, it is possible to exhibit a more excellent vibration damping property for the non-restraint type vibration damping material.

At least one of loss moduli G" at 10° C. and 30° C. measured under the conditions is preferably $8.0 \times 10^6$ Pa or more, more preferably $1.0 \times 10^7$ Pa or more, further preferably $2.0 \times 10^7$ Pa or more.

In order to satisfy the condition (7), for example, it is effective that isoprene is used as a monomer that constitutes a structural unit derived from the conjugated diene compound.

Although there is no particular limitation, from the viewpoint of exhibiting a more excellent vibration damping property for the non-restraint type vibration damping material, it is desirable that the block copolymer of the present invention further satisfies the following condition (8).
<Condition (8)>

Condition (8): In a temperature region of 0° C. to +50° C., tan δ indicates a value having a peak intensity of 0.1 or more.

When this condition is satisfied, it becomes easy to secure a good vibration damping property in a relatively high temperature region. The peak intensity of tan δ is preferably 0.3 or more, more preferably 0.5 or more, most preferably 0.7 or more.

In order to satisfy the condition (8), it is effective that, for example, isoprene is used as a monomer that constitutes a structural unit derived from the conjugated diene compound.
(Method of Producing Block Copolymer)

The block copolymer of the present invention may be produced by, for example, a solution polymerization method, an emulsification polymerization method, a solid phase polymerization method or the like. Among them, the solution polymerization method is preferred, and for example, conventionally known methods, such as an ionic polymerization method (such as anionic polymerization, and cationic polymerization) and a radical polymerization method, may be applied. Among them, an anionic polymerization method is preferred. In the anionic polymerization method, an aromatic vinyl compound, and at least one type selected from the group consisting of a conjugated diene compound and isobutylene are sequentially added in the presence of a solvent, an anionic polymerization initiator, and if necessary, a Lewis base so as to obtain a block copolymer, and then, if necessary, a coupling agent is added so as to perform a reaction. Further, by hydrogenating the block copolymer, a hydrogenated block copolymer may be obtained.

As described below, it is desirable that the method of producing the block copolymer is carried out under a relatively mild condition in order to satisfy the conditions (1) to (4).

Examples of an organolithium compound that may be used as a polymerization initiator for anionic polymerization in the above method include methyl lithium, ethyl lithium, n-butyl lithium, sec-butyl lithium, tert-butyl lithium, and pentyl lithium. In addition, examples of a dilithium compound that may be used as a polymerization initiator include naphthalene dilithium, and dilithiohexyl benzene.

Examples of the coupling agent include dichloromethane, dibromomethane, dichloroethane, dibromoethane, dibromobenzene, and phenyl benzoate.

Usage amounts of the polymerization initiator and the coupling agent are properly determined according to a desired weight average molecular weight of a target block copolymer. Generally, it is desirable to use the initiator such as an alkyl lithium compound, or a dilithium compound at a ratio of 0.01 to 0.2 parts by mass with respect to 100 parts by mass of a total of monomers used for polymerization (such as an aromatic vinyl compound and a conjugated diene compound), and when the coupling agent is used, it is desirable that in the use thereof, the ratio is 0.001 to 0.8 parts by mass with respect to 100 parts by mass of a total of the monomers.

The solvent is not particularly limited as long as it does not adversely affect an anionic polymerization reaction, and examples thereof include aliphatic hydrocarbon such as cyclohexane, methyl cyclohexane, n-hexane, and n-pentane; and aromatic hydrocarbon such as benzene, toluene, and xylene. In addition, the polymerization reaction is carried out generally at a temperature of 0 to 100° C., preferably at 10 to 70° C., for 0.5 to 50 h, preferably for 1 to 30 h.

In addition, at the time of polymerization, by adding a Lewis base as a co-catalyst (vinyl agent), the content of 3,4-bonds and 1,2-bonds in the polymer block (B) (the amount of vinyl bonds) may be increased, but in the present invention, in order to solve the above problem, it is desirable that 2,2-di(2-tetrahydrofuryl)propane (DTHFP) is used as the Lewis base. The employment of the DTHFP increases both the amount of vinyl bonds and the hydrogenation rate under a mild condition while containing isoprene as the conjugated diene compound, and allows easy to obtain a hydrogenated product of a block copolymer excellent in mechanical properties.

A Lewis base has conventionally generally been used as a vinyl agent in order to increase an amount of vinyl bonds in the hydrogenated product of the block copolymer. As this Lewis base, ethers such as tetrahydrofuran (THF), amines such as N,N,N',N'-tetramethylethylene diamine (TMEDA), and the like have been used (see paragraph [0028] in PTL 2).

Meanwhile, in the hydrogenated product of the block copolymer which has the polymer block (A) containing a structural unit derived from the aromatic vinyl compound, and the polymer block (B) containing a structural unit derived from the conjugated diene compound, for example, when the polymer block (B) is composed of only butadiene, due to its low steric hindrance, it has been relatively easy to achieve both a large amount of vinyl bonds and a high hydrogenation rate even by a conventional method.

However, from the viewpoint of increasing a vibration damping property under a temperature condition that is actually used, it is effective that the polymer block (B) contains isoprene. However, when isoprene is contained, due to its high steric hindrance, it has been difficult to increase both the amount of vinyl bonds and the hydrogenation rate.

In addition, for example, as in Production Example 7 of the prior document 3, although there is an example where both the amount of vinyl bonds and the hydrogenation rate are high, since TMEDA is used as a vinyl agent in the same document, TMEDA inactivates a hydrogenation catalyst, and thus it is required to use a large amount of hydrogenation catalyst. In this case, the cause was not clear, but even if the amount of vinyl bonds and the hydrogenation rate are numerically high, it was difficult to increase the vibration damping property under a temperature condition that is actually used.

In addition, it has been turned out that when a large amount of hydrogenation catalyst is used as described above, nuclear hydrogenation in which a benzene ring of the polymer block (A) is hydrogenated occurs, and this causes a problem in that mechanical properties required for the vibration damping material is not obtained.

The present inventors have found that employment of DTHFP as a vinyl agent, even for the block copolymer containing isoprene, allows to achieve both the large amount of vinyl bonds and the high hydrogenation rate under a mild condition not using a large amount of hydrogenating agent. Since both the large amount of vinyl bonds and the high hydrogenation rate are achieved under the mild condition, it is possible to obtain a block copolymer in which the hydrogenation rate is high, and the vibration damping property is high under a temperature condition that is actually used.

As long as the effects of the present invention are not impaired, other Lewis bases may be used in combination with the DTHFP. Examples of other Lewis bases include ethers such as dimethyl ether, diethyl ether, and tetrahydrofuran; glycol ethers such as ethyleneglycol dimethyl ether, and diethyleneglycol dimethyl ether; and amines such as triethylamine, N N,N',N'-tetramethylene diamine, and N-methyl morpholine.

The addition amount of DTHFP is determined according to how much amount of vinyl bonds of an isoprene unit and/or a butadiene unit constituting the polymer block (B) is controlled. Therefore, it is desirable that the addition amount of the Lewis base to be used falls within a range of generally 0.1 to 1,000 moles, preferably 0.3 to 100 moles, most preferably 0.5 to 10 moles per gram atom of lithium contained in an alkyl lithium compound or a dilithium compound used as a polymerization initiator, from the viewpoint of satisfying the condition (3).

After the polymerization is performed by the above-described method, an active hydrogen compound such as alcohols, carboxylic acids, or water is added so as to stop the polymerization reaction. Then, by carrying out a hydrogenation reaction in an inert organic solvent in the presence of a hydrogenation catalyst, a hydrogenated copolymer may be obtained. The hydrogenation reaction may be carried out at a hydrogen pressure of OA to 20 MPa, preferably 0.5 to 15 MPa, more preferably 0.5 to 5 MPa, at a reaction temperature of 20 to 250° C., preferably 50 to 180° C., more preferably 70 to 180° C., for a reaction time of generally 0.1 to 100 h, preferably 1 to 50 h.

Examples of the hydrogenation catalyst include Raney nickel; a Ziegler-based catalyst composed of a combination of a transition metal compound, an alkyl aluminum compound, an alkyl lithium compound, etc.; and a metallocene-based catalyst from the viewpoint of carrying out the hydrogenation reaction of the polymer block (B) while suppressing nuclear hydrogenation of the aromatic vinyl compound. From the same viewpoint described above, among them, a Ziegler-based catalyst is preferred, a Ziegler-based catalyst composed of a combination of a transition metal compound and an alkyl aluminum compound is more preferred, and a Ziegler-based catalyst (Al/Ni-based Ziegler catalyst) composed of a combination of a nickel compound and an alkyl aluminum compound is further preferred.

The hydrogenated block copolymer obtained in this manner may be acquired by pouring and solidifying a polymerization reaction solution in methanol, etc. and then performing heating or drying by heating or under reduced pressure, or by performing so-called steam stripping in which together with steam, the polymerization reaction solution is poured in hot water, and a solvent is subjected to azeotropic treatment, and performing by heating or under reduced pressure.

Although there is no particular limitation, in the hydrogenated block copolymer of the present invention obtained in this manner, the used Lewis base tends to remain in the polymer. That is, the hydrogenated block copolymer of the present invention may contain 2,2-di(2-tetrahydrofuryl)propane (DTHFP), and in general, the content of DTHFP tends to be 5 ppm by mass or more, and the content of DTHFP may be 10 ppm by mass or more. The upper limit value of the content of DTHFP is usually 50 ppm by mass, and may be 30 ppm by mass.

Meanwhile, according to the production method, the hydrogenated block copolymer of the present invention may not contain any of Lewis bases (vinyl agents) other than DTHFP, specifically, dimethyl ether, diethyl ether, tetrahydrofuran (THF), ethyleneglycol dimethyl ether, diethyleneglycol dimethyl ether, triethylamine, N,N,N',N'-tetramethylene diamine (TMEDA) and N-methyl morpholine, or alternatively, the content of each of these tends to be 1 ppm or less.

The content of the Lewis base within the hydrogenated block copolymer is not particularly limited, but may be obtained by gas chromatography.

The block copolymer of the present invention and a resin composition containing the block copolymer may suitably take shapes such as a pellet, a bale, and powder.

In addition, a molded body obtained by molding the block copolymer of the present invention and the resin composition containing the block copolymer is also provided.

[Applications]

The block copolymer of the present invention and the resin composition containing the block copolymer exhibit an excellent vibration damping property, when used as the non-restraint type vibration damping material. Thus, the present invention is useful for vibration damping materials, sound insulating materials, dam rubber, shoe sole materials, flooring materials, etc. which contain the block copolymer of the present invention or the resin composition. Further, using in weather strips, floor mats, etc. is also possible.

In addition, using for an adhesive or a sticking agent, a sealing material, a packing, an O ring, a belt, a sound proofing material, and the like, is possible in various electrical products in the field of home appliances, such as TVs, various recorders such as Blu-ray recorders or HDD recorders, projectors, game machines, digital cameras, home videos, antennas, speakers, electronic dictionaries, IC recorders, FAX machines, copy machines, telephones, doorphones, rice cookers, microwave ovens, oven ranges, refrigerators, dishwashers, dish dryers, IH cooking heaters, hot plates, vacuum cleaners, washing machines, chargers, sewing machines, irons, dryers, electric bicycles, air purifiers, water purifiers, electric toothbrushes, lighting equipment, air conditioners, outdoor units of the air-conditioners, dehumidifiers, and humidifiers.

[Laminate]

The present invention also provides a laminate that has an X layer containing the block copolymer of the present invention, and a Y layer laminated on one side surface of the X layer. The laminate of the present invention is excellent in the vibration damping because the non-restraint type vibration damping material is disposed. More specifically, this is a laminate provided with the non-restraint type vibration damping material, and corresponds to the laminate 200 in which the vibration damping material layer 23 (corresponding to the X layer to be described below) is disposed on one side surface of the base material 22 (corresponding to the Y layer to be described below) as illustrated in FIG. 1(B) described above.

[X Layer]

The X layer is a layer containing the block copolymer of the present invention, or may be a layer containing only the block copolymer of the present invention or may be a layer composed of a composition containing components other than the block copolymer of the present invention.

For example, when the X layer is formed on a glass substrate, examples of components other than the block copolymer of the present invention include an antioxidant, a UV absorber, a light stabilizer, a heat shielding material, and an anti-blocking agent, but there is no particular limitation to these. One of these may be used along or two or more thereof may be used in combination.

Examples of the antioxidant include a phenol-based antioxidant, a phosphorus-based antioxidant, and a sulfur-based antioxidant.

Examples of the UV absorber include, a benzotriazole-based UV absorber, a hindered amine-based UV absorber, and a benzoate-based UV absorber, as well as a triazine-based compound, a benzophenone-based compound, a malonic acid ester compound, and an oxalic acid anilide compound.

Examples of the light stabilizer include a hindered amine-based light stabilizer.

Examples of the heat shielding material include a material in which resin or glass contains heat-ray shielding particles having a heat-ray shielding function, or an organic dye compound having a heat-ray shielding function. Examples of the particles having the heat-ray shielding function include: particles of oxides such as tin-doped indium oxide, antimony-doped tin oxide, aluminum-doped zinc oxide, tin-doped zinc oxide, and silicon-doped zinc oxide; and particles of inorganic materials having a heat-ray shielding function, such as $LaB_6$ (lanthanum hexaboride) particles. In addition, examples of the organic dye compound having the heat-ray shielding function include a diimmonium-based dye, an aminium-based dye, a phthalocyanine-based dye, an anthraquinone-based dye, a polymethine-based dye, a benzene dithiol type ammonium-based compound, a thiourea derivative, and a thiol metal complex.

Examples of the anti-blocking agent include inorganic particles, and organic particles. Examples of the inorganic particles include oxides, hydroxide, sulfides, nitrides, halides, carbonates, sulfates, acetates, phosphates, phosphites, organic carboxylates, silicates, titanates, and borates of elements of IA, IIA, IVA, VIA, VIIA, VIIIA, IB, IIB, IIIB, and IVB groups, and hydrous compounds thereof, and complex compounds and natural mineral particles centered on these. Examples of the organic particles include a fluororesin, a melamine-based resin, a styrene-divinyl benzene copolymer, an acrylic resin silicon, and crosslinked products thereof.

In addition, for example, even when the X layer is used for a sound insulating material or a vibration damping material application, particularly, for an application of a sound insulating material or a vibration damping material of automobiles, the X layer is a layer containing the block copolymer of the present invention, or may be a layer containing only the block copolymer of the present invention or may be a layer composed of a composition containing components other than the block copolymer of the present invention. When the X layer is used for a sound insulating material or a vibration damping material application, particularly, for an application of a sound insulating material or a vibration damping material of automobiles, examples of the components other than the block copolymer of the present invention include an antioxidant, a UV absorber, a light stabilizer, a heat shielding material, an anti-blocking agent, a pigment, a dye, a softening agent, a cross-linking agent, an auxiliary cross-linking agent, and a cross-linking accelerator, but there is no particular limitation to these. One of these may be used alone or two or more thereof may be used in combination.

Examples of the antioxidant, the UV absorber, the light stabilizer, the heat shielding material, and the anti-blocking agent include the same as those described above, in the description for the case where the X layer is formed on the glass substrate.

Examples of the pigment include an organic pigment and an inorganic pigment. Examples of the organic pigment include an azo-based pigment, a quinacridone-based pigment, and a phthalocyanine-based pigment. Examples of the inorganic pigment include titanium oxide, zinc oxide, zinc sulfide, carbon black, a lead-based pigment, a cadmium-based pigment, a cobalt-based pigment, an iron-based pigment, a chromium-based pigment, ultramarine blue, and dark blue.

Examples of the dye include azo-based, anthraquinone-based, phthalocyanine-based, quinacridone-based, perylene-based, dioxazine-based, anthraquinone-based, indolinone-based, isoindolinone-based, quinoneimine-based, triphenylmethane-based, thiazole-based, nitro-based, and nitroso-based dyes.

Examples of the softening agent include conventionally known softening agents, for example, hydrocarbon-based oils such as paraffin-based, naphthene-based, and aromatic; vegetable oils such as peanut oil, and rosin; phosphate ester; low molecular weight polyethylene glycol; liquid paraffin; and hydrocarbon-based synthetic oils, such as low molecular weight polyethylene, ethylene-α-olefin copolymerized oligomer, liquid polybutene, liquid polyisoprene or its hydrogenated product, and liquid polybutadiene or its hydrogenated product. One of these may be used alone or two or more thereof may be used in combination.

Examples of the cross-linking agent include a radical generator, sulfur and a sulfur compound.

Examples of the radical generator include organic peroxides, e.g., dialkyl monoperoxides such as dicumyl peroxide, dit-butyl peroxide, and t-butylcumyl peroxide; diperoxides such as 2,5-dimethyl-2,5-di(t-butylperoxy)hexane, 2,5-dimethyl-2,5-di(t-butylperoxy)hexin-3, bis(t-butyldioxyisopropyl)benzene, 1,1-bis(t-butylperoxy)-3,3,5-trimethyl cyclohexane, and n-butyl-4,4-bis(t-butylperoxy)valerate; diacyl peroxides such as benzoyl peroxide, p-chlorobenzoyl peroxide, and 2,4-dichlorobenzoyl peroxide; monoacylalkyl peroxides such as t-butylperoxybenzoate; percarbonates such as t-butylperoxy isopropyl carbonate; and diacyl peroxides such as diacetyl peroxide, and lauroyl peroxide. One of these may be used alone or two or more thereof may be used in combination. Among them, 2,5-dimethyl-2,5-di(t-butylperoxy)hexane, and dicumyl peroxide are preferred from the viewpoint of reactivity.

Examples of the sulfur compound include sulfur monochloride, and sulfur dichloride.

Besides, examples of the cross-linking agent also include phenol-based resins such as an alkyl phenol resin, and a brominated alkyl phenol resin; and combinations between p-quinonedioxime and lead dioxide, and between p,p'-dibenzoylquinonedioxime and trilead tetroxide.

As the auxiliary cross-linking agent, conventionally known auxiliary cross-linking agents may be used, and examples thereof include polyfunctional monomers, such as trimethylol propane trimethacrylate, trimethylol propane triacrylate, trimellitic acid triallyl ester, 1,2,4-benzene tricarboxylic acid triallyl ester, triallyl isocyanurate, 1,6-hexanediol dimethacrylate, 1,9-nonanediol dimethacrylate, 1,10-decanediol dimethacrylate, polyethylene glycol dimethacrylate, ethylene glycol dimethacrylate, diethylene glycol dimethacrylate, triethylene glycol dimethacrylate, divinyl benzene, glycerol dimethacrylate, and 2-hydroxy-3-acryloyloxypropyl methacrylate; stannous chloride, ferric chloride, organic sulfonic acid, polychloroprene, and chlorosulfonated polyethylene. One of the auxiliary cross-linking agents may be used alone or two or more thereof may be used in combination.

Examples of the cross-linking accelerator include: thiazoles such as N,N-diisopropyl-2-benzothiazole sulfenamide, 2-mercaptobenzothiazole, and 2-(4-morpholinodithio)benzothiazole; guanidines such as diphenyl guanidine, and triphenyl guanidine; aldehyde-amine-based reactants or aldehyde-ammonia-based reactants such as a butyl aldehyde-aniline reactant, and a hexamethylenetetramine-acetaldehyde reactant; imidazolines such as 2-mercaptoimidazoline; thioureas such as thiocarbanilide, diethyl urea, dibutyl thiourea, trimethyl thiourea, and diorthotolyl thiourea; dibenzothiazyl disulfide; thiuram monosulfides or thiuram polysulfides such as tetramethyl thiuram monosulfide, tetramethylthiuram disulfide, and pentamethylenethiuram tetrasulfide; thiocarbamates such as zinc dimethyldithiocarbamate, zinc ethylphenyldithiocarbamate, sodium dimethyldithiocarbamate, selenium dimethyldithiocarbamate, and tellurium diethyldithiocarbamate; xanthic acid salts such as zinc dibutylxanthate; and zinc oxide. One of the cross-linking accelerators may be used alone or two or more thereof may be used in combination.

In addition, as long as the effects of the present invention are not impaired, without particular limitations on applications, the block copolymer of the present invention may be used by mixing with additives such as a crystal nucleating agent; hydrogenate-based resins such as a hydrogenated coumarone indene resin, a hydrogenated rosin-based resin, a hydrogenate terpene resin, and an alicyclic hydrogenate petroleum resin; tackifier resins such as an aliphatic-based resin composed of olefin and diolefin polymers; and other polymers such as hydrogenate polyisoprene, hydrogenate polybutadiene, butyl rubber, polyisobutylene, and polybutene.

Further, without particular limitations on applications, the block copolymer of the present invention may be used by mixing with various additives. Examples of these additives include inorganic filler such as talc, clay, mica, calcium silicate, glass, glass hollow sphere, glass fiber, calcium carbonate, magnesium carbonate, basic magnesium carbonate, aluminum hydroxide, magnesium hydroxide, calcium hydroxide, zinc borate, dawsonite, ammonium polyphosphate, calcium aluminate, hydrotalcite, silica, diatomite, alumina, titanium oxide, iron oxide, zinc oxide, magnesium oxide, tin oxide, antimony oxide, barium ferrite, strontium ferrite, carbon black, graphite, carbon fiber, activated carbon, carbon hollow sphere, calcium titanate, lead zirconate titanate, silicon carbide, and mica; organic filler such as wood flour, and starch; and an organic pigment. These additives may be added to a composition, as, for example, a reinforcing agent for increasing the rigidity, or filler for increasing the volume without changing the function of the composition.

In addition, if necessary, the block copolymer of the present invention may be used by mixing with other additives such as a lubricant, an antistatic agent, a flame retardant, a foaming agent, a water repellent, a waterproofing agent, a conductivity imparting agent, a thermal conductivity imparting agent, an electromagnetic wave shielding agent, a fluorescent agent, and an antibacterial agent.

The present invention also provides a resin composition containing the block copolymer, which may be typically a resin composition that contains the block copolymer as an (L) component, and one or more types among a polyolefin-based resin, a polyamide-based resin, a polyester-based resin, a styrene-based resin, an acryl-based resin, a polyoxymethylene-based resin, an ABS resin, polyphenylene sulfide, polyphenylene ether, a polyurethane-based thermoplastic elastomer, polycarbonate, a rubber material, and an elastomer material, as an (M) component.

In this case, the content ratio [(L)/(M)] of the (L) component and the (M) component is preferably 1/99 to 99/1, more preferably 3/97 to 97/3, further preferably 5/95 to 95/5 by a mass ratio, and is further preferably 5/95 to 50/50, particularly preferably 5/95 to 20/80 from the viewpoint of mechanical properties.

Specifically, the polyolefin-based resin may be used in mixture with other polymers, such as an ethylene-propylene copolymer, an ethylene-butylene copolymer, a propylene-butylene copolymer, a polyolefin-based resin, an olefin-based polymer, a polyethylene-based resin, and a dynamically crosslinked thermoplastic elastomer (TPV).

Here, examples of olefin constituting the polyolefin-based resin include ethylene, propylene, 1-butene, 1-pentene, 1-hexene, 1-octene, 4-methyl-1-pentene, and cyclohexene. The polyolefin-based resin may be composed of only one type or two or more types of olefins. In particular, examples of a polypropylene-based resin, as one of the polyolefin-based resins, include homopolypropylene, a propylene-ethylene random copolymer, a propylene-ethylene block copolymer, a propylene-butene random copolymer, a propylene-ethylene-butene random copolymer, a propylene-pentene random copolymer, a propylene-hexene random copolymer, a propylene-octene random copolymer, a propylene-ethylene-pentene random copolymer, and a propylene-ethylene-hexene random copolymer. In addition, it is also possible to use modified polypropylene-based resins obtained by graft-copolymerizing these polypropylene-based resins with modifiers, e.g., unsaturated monocarboxylic acids such as acrylic acid, methacrylic acid, and crotonic acid; unsaturated dicarboxylic acids such as maleic acid, citraconic acid, and itaconic acid; esters, amides or imides of these unsaturated monocarboxylic acids or unsaturated dicarboxylic acids; and unsaturated dicarboxylic acid anhydrides such as maleic anhydride, citraconic anhydride, and itaconic anhydride.

The olefin-based polymer is at least one type of olefin-based polymer selected from the group consisting of ethylene-propylene-diene copolymer (EPDM) rubber, ethylene-vinyl acetate copolymer (EVA), and polyethylene-based resin.

As diene that may be used as a raw material for the ethylene-propylene-diene copolymer rubber, chain non-conjugated dienes such as 1,4-hexadiene, 1,6-octadiene, 2-methyl-1,5-hexadiene, 6-methyl-1,6-heptadiene, and 7-methyl-1,6-octadiene; cyclic non-conjugated dienes such as cyclohexadiene, dichloropentadiene, methyl tetrahydroindene, 5-vinyl norbornene, 5-ethylidene-2-norbornene, 5-methylene-2-norbornene, 5-isopropylidene-2-norbornene, and 6-chloromethyl-5-isopropenyl-2-norbornene; and trienes such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene may be exemplified.

Examples of the polyethylene-based resin include ethylene homopolymers such as high density polyethylene, medium density polyethylene, and low density polyethylene; and ethylene-based copolymers such as an ethylene/butene 1 copolymer, an ethylene/hexene copolymer, an ethylene/heptene copolymer, an ethylene/octene copolymer, an ethylene/4-methylpentene 1 copolymer, an ethylene/vinyl acetate copolymer, an ethylene/acrylic acid copolymer, an ethylene/acrylic acid ester copolymer, an ethylene/methacrylic acid copolymer, and an ethylene/methacrylic acid ester copolymer.

Examples of polyamide include polyamide 6, polyamide 6.6, polyamide 6.10, polyamide 11, polyamide 12, polyamide 6.12, polyhexamethylene diamineterephthalamide, polyhexamethylenediamine isophthalamide, and polyamide containing a xylene group. Examples of the polyester-based resin include polyethylene terephthalate, and polybutylene terephthalate. Examples of the acryl-based resin include methyl polyacrylate, and polymethyl methacrylate. Examples of the polyoxymethylene-based resin include a polyoxymethylene homopolymer, and a polyoxymethylene copolymer. Examples of the styrene-based resin include a styrene homopolymer, an α-methyl styrene homopolymer, an acrylonitrile-styrene resin, and an acrylonitrile-butadiene-styrene resin. Examples of the rubber material include isobutylene-isoprene copolymer rubber; ethylene-propylene copolymer rubber (EPM); styrene-butadiene copolymer rubber, styrene-isoprene copolymer rubber, and hydrogenated products or modified products thereof; natural rubber; synthetic isoprene rubber, liquid poly isoprene rubber, and hydrogenated products or modified products thereof; chloroprene rubber; acryl rubber; butyl rubber; acrylonitrile-butadiene rubber; epichlorohydrin rubber; silicon rubber; fluororubber; chlorosulfonated polyethylene; and urethane rubber. Examples of the elastomer material include a polyurethane-based elastomer, a polyamide-based elastomer, a styrene-based elastomer, and a polyester-based elastomer.

The resin composition containing the block copolymer may contain the above-described additives such as a reinforcing agent, filler, a lubricant, an antistatic agent, a flame retardant, a foaming agent, a water repellent, a waterproofing agent, a conductivity imparting agent, a thermal conductivity imparting agent, an electromagnetic wave shielding agent, a fluorescent agent, and an antibacterial agent.

Even in the case for dam rubber, shoe sole materials, flooring materials, etc., a resin composition containing other materials as well as the block copolymer of the present invention may be used. Conventionally known materials used for the dam rubber, the shoe sole materials, and the flooring materials may be contained, but there is no particular limitation. For example, an olefin-based polymer, a cross-linking agent, an auxiliary cross-linking agent, a cross-linking accelerator, a foaming agent, an auxiliary foaming agent, an auxiliary processing agent, various resins, and various additives may be contained.

The content of the additives in the resin composition containing the block copolymer is not particularly limited, and may be properly adjusted according to the types of the additives, the use of the resin composition, or the like. When the resin composition contains the additives, the content of the additives may be, for example, 50% by mass or less, 45% by mass or less, or 30% by mass or less, and may be 0.01% by mass or more, 0.1% by mass or more, or 1% by mass or more with respect to 100% by mass of the total amount of the resin composition.

The method of producing the resin composition is not particularly limited, and a conventionally known method may be adopted. For example, the block copolymer of the present invention and other materials may be mixed by using a mixer such as a Henschel mixer, a V blender, a ribbon blender, a tumbler blender, or a conical blender in the production, or after the mixing, melt-kneading may be performed by a single-screw extruder, a twin-screw extruder, a kneader or the like in the production. In addition, in the case of foaming, for example, in the obtaining, a resin composition in which a foaming agent is dry-blended may be injected into a mold provided with a cavity having a desired shape, and may be foam-molded.

When the X layer is a layer composed of a composition containing components other than the block copolymer of the present invention, the content of the block copolymer of the present invention, in the composition, is not particularly limited, but is preferably 50% by mass or more, more preferably 60% by mass or more, further preferably 80% by mass or more, particularly preferably 90% by mass or more, most preferably 95% by mass or more from the viewpoint of vibration damping.

The thickness of the X layer is not particularly limited, but is preferably 10 to 800 μm, more preferably 30 to 500 μm, further preferably 50 to 500 μm, particularly preferably 70 to 350 μm. In particular, the X layer may range from 50 to 150 μm, or from 200 to 350 μm.

[Y Layer]

In the laminate of the present invention, although there is no particular limitation, the Y layer is preferably a glass layer. The thickness of the glass layer (the thickness of one layer in the case of a plurality of glass layers) is preferably 0.5 to 5 mm, more preferably 0.5 to 3.0 mm, further preferably 1.0 to 2.5 mm, particularly preferably 1.2 to 1.8 mm. From the viewpoint of weight reduction, if the thickness of the glass layer is 5 mm or less, this is thinner than before in the setting. Thus, the sound insulation property is originally likely to be reduced. However, the laminate using the hydrogenated block copolymer of the present invention exhibits a sufficient sound insulation property. When the thickness of the glass layer is 0.5 mm or more, a sufficient sound insulation property may be obtained.

The glass used for the glass layer is not particularly limited, and examples thereof include inorganic glasses, such as float plate glass, polished plate glass, template glass, wired plate glass, and heat-ray absorbing plate glass, and conventionally known organic glasses. The glass may be colorless, colored, transparent, translucent, or non-transparent.

In the laminate of the present invention, the Y layer may be a layer (an auxiliary adhesive layer or a skin layer) containing a thermoplastic resin (i) different from the block copolymer of the present invention. In the thermoplastic resin (i), the shear storage modulus (G') at a temperature of 25° C., which is measured by carrying out a complex shear viscosity test under a condition of a frequency of 1 Hz in accordance with JIS K7244-10 (2005), is preferably 10 MPa or more, more preferably 15 MPa or more, further preferably 20 MPa or more, particularly preferably 20 to 70 MPa, most preferably 35 to 55 MPa. In this case, it is possible to reinforce the weather resistance and the strength of the X layer or to adjust the adhesiveness with the glass layer.

When the Y layer is a layer (an auxiliary adhesive layer or a skin layer) containing the thermoplastic resin (i), from the viewpoint of sound insulation property, the X layer preferably accounts for 10% or more of the thickness of the auxiliary adhesive layer, more preferably 20% or more, further preferably 60% or more. The upper limit value is not particularly limited, but is preferably 200% or less, more preferably 160% or less, further preferably 130% or less.

The layer (the auxiliary adhesive layer or the skin layer) containing the thermoplastic resin (i) may have an uneven shape on the surface.

Examples of the thermoplastic resin (i) include a polyvinyl acetal resin, an ionomer, an ethylene-vinyl acetate copolymer, a urethane resin, and a polyamide resin. Among them, from the viewpoint of adhesiveness and transparency, a polyvinyl acetal resin, and an ionomer are preferred.

(Polyvinyl Acetal Resin)

The polyvinyl acetal resin is a resin having a repeating unit represented by the following formula.

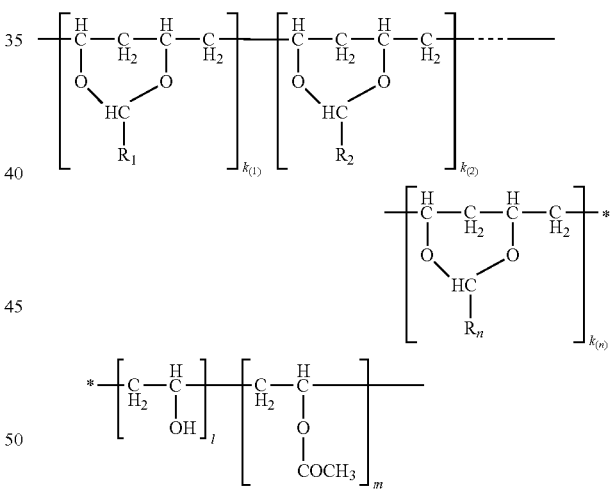

In the formula, n represents the number of types of aldehyde used for an acetalization reaction. $R_1, R_2, \ldots, R_n$ represent an alkyl residue or a hydrogen atom of aldehyde used for the acetalization reaction, and each of $k_{(1)}, k_{(2)}, \ldots, k_{(n)}$ represents the ratio (molar ratio) of the structural unit indicated by [ ]. In addition, l represents the ratio of the vinyl alcohol unit (molar ratio), and m represents the ratio of the vinyl acetate unit (molar ratio).

Meanwhile, $k_{(1)} + k_{(2)} + \ldots k_{(n)} + l + m = 1$, and any of $k_{(1)}, k_{(2)}, \ldots, k_{(n)}, l$ and m may be zero.

The repeating units are not particularly limited by the arrangement order, and may be arranged randomly, may be arranged in a block form, or may be arranged in a tapered form.

A method of producing the polyvinyl acetal resin is not particularly limited, and a conventionally known method, for example, a method described in International Publication No. 2012/026501, may be employed.

Examples of the polyvinyl acetal resin include polyvinyl acetal resins described in International Publication No. 2012/026501, and among them, polyvinyl butyral (PVB) is preferred.

(Ionomer)

Although there is no particular limitation, examples of the ionomer include a resin, in which a structural unit derived from ethylene, and a structural unit derived from α,β-unsaturated carboxylic acid are contained, and at least a part of the α,β-unsaturated carboxylic acid is naturalized by a metal ion. Examples of the metal ion include a sodium ion. In the ethylene-α,β-unsaturated carboxylic acid copolymer serving as a base polymer, although there is no particular limitation, the content ratio of the structural unit of α,β-unsaturated carboxylic acid is preferably 2% by mass or more, more preferably 5% by mass or more. In addition, although there is no particular limitation, the content ratio of the structural unit of α,β-unsaturated carboxylic acid is preferably 30% by mass or less, more preferably 20% by mass or less.

Examples of the α,β-unsaturated carboxylic acid constituting the ionomer include acrylic acid, methacrylic acid, maleic acid, monomethyl maleate, monoethyl maleate, and maleic anhydride. Among them, acrylic acid, and methacrylic acid are preferred.

In the present invention, from the viewpoint of availability, an ionomer of an ethylene-acrylic acid copolymer, and an ionomer of an ethylene-methacrylic acid copolymer are preferred, and a sodium ionomer of an ethylene-acrylic acid copolymer, and a sodium ionomer of an ethylene-methacrylic acid copolymer are more preferred.

When the Y layer is a layer containing the thermoplastic resin (i), this may be a layer containing only the thermoplastic resin (i), or may be a layer composed of a composition containing components other than the thermoplastic resin (i).

Examples of the components other than the thermoplastic resin (i) include an adhesive strength modifier, a plasticizer, an antioxidant, a UV absorber, a light stabilizer, an anti-blocking agent, a pigment, a dye, and a heat shielding material, but are not particularly limited to these. One of these may be used alone or two or more thereof may be used in combination.

As the adhesive strength modifier, those disclosed in International Publication No. 03/033583 may also be used. Examples thereof include alkali metal salt, and alkaline earth metal salt, and more specific examples thereof include salts of potassium, sodium, and magnesium. Examples of the salts include salts of organic acids such as carboxylic acids, for example, octanoic acid, hexanoic acid, butyric acid, acetic acid, formic acid; and inorganic acids such as hydrochloric acid, and nitric acid.

Although there is no particular limitation, examples of the plasticizer include carboxylic acid ester-based plasticizers such as monovalent carboxylic acid ester-based, and polyvalent carboxylic acid ester-based; phosphoric acid ester-based plasticizers; organic phosphorous acid ester-based plasticizers; polymer plasticizers such as carboxylic acid polyester-based, polyester carbonate-based, and polyalkylene glycol-based; and hydroxycarboxylic acid ester-based plasticizers such as an ester compound of hydroxycarboxylic acid of castor oil, etc. and polyvalent alcohol, and an ester compound of hydroxycarboxylic acid and monovalent alcohol.

The description on the antioxidant, the UV absorber, the light stabilizer, the anti-blocking agent, the pigment, the dye and the heat shielding material is the same as the description on these in the X layer described above.

When the Y layer is a layer composed of a composition containing the thermoplastic resin (i), although there is no particular limitation, from the viewpoint of adhesiveness, etc., the content of the thermoplastic resin (i) in the composition is preferably 50% by mass or more, more preferably 60% by mass or more, further preferably 80% by mass or more, particularly preferably 90% by mass or more, most preferably 95% by mass or more.

A method of producing the laminate of the present invention is not particularly limited, and examples thereof include a method using a vacuum laminator, a method using a vacuum bag, a method using a vacuum ring, and a method using a nip roll.

There is no particular limitation to conditions for nip-rolling. A molded product obtained through co-extrusion using an extruder at about 180 to 230° C. may be taken at a predetermined take-out speed while placed between two rolls such as metal mirror-surface rolls. In addition, when the vacuum laminator is used, a hot plate temperature is preferably from 140 to 190° C., an evacuation time is preferably 6 to 20 min, a press pressure is preferably 35 to 65 MPa, and a press time is preferably 10 to 30 min.

When the vacuum laminator device is used, for example, lamination may be performed under a reduced pressure of $1\times10^{-6}$ to $3\times10^{-2}$ MPa, at 100 to 200° C., particularly 130 to 170° C. The method using the vacuum bag or the vacuum ring is described in, for example, the specification of European Patent No. 1235683, and, for example, lamination may be performed under a pressure of about $2\times10^{-2}$ MPa, at 130 to 145° C.

When the nip roll is used, for example, there may be a method of performing first temporary crimping at a temperature equal to or less than the flow starting temperature of a material of an auxiliary adhesive layer such as an ionomer or a polyvinyl acetal resin, and then further performing temporary crimping under conditions close to the flow starting temperature.

In addition, the main crimping by an autoclave depends on the thickness and the configuration of a module, but is preferably carried out, for example, under a pressure of about 1 to 15 MPa, at 130 to 155° C., for about 0.5 to 2 h.

EXAMPLES

Hereinafter, the present invention will be described in more detail by Examples, but the present invention is not limited by these Examples.

Hereinafter, descriptions will be made on the method of producing a block copolymer used in each Example.

Examples 1 to 3, 37 to 38 and Comparative Examples 1 to 4

(Production of Block Copolymer)

Block copolymers TPE-1 to TPE-9 were produced by the following procedure.

In a pressure-resistant container that had been replaced with nitrogen and dried, 50 kg of cyclohexane (solvent) dried with molecular sieves A4, and 0.25 kg of sec-butyl lithium cyclohexane solution with a concentration of 10% by mass as an anionic polymerization initiator (substantial addition amount of sec-butyl lithium: 40 g) were charged.

After the temperature inside the pressure-resistant container was raised to 50° C., 3.21 kg of styrene (1) was added to perform polymerization for 30 min. Then, the temperature was lowered to 40° C., 0.171 kg of 2,2-di(2-tetrahydrofuryl)propane (DTHFP) was added, and 8.24 kg of isoprene and 6.74 kg of butadiene were added for 5 h to perform polymerization for 1 h. Then, the temperature was raised to 50° C., and 3.21 kg of styrene (2) was added to perform polymerization for 30 min. Methanol was added to stop the reaction, and a reaction solution containing a triblock copolymer of polystyrene-polyisoprene-polybutadiene-polystyrene was obtained.

The reaction solution was heated to 50° C., and pressurized to a hydrogen pressure of 1 MPa, and then, a Ziegler-based catalyst (hydrogenation catalyst) formed of nickel octylate and trimethyl aluminum was added thereto under a hydrogen atmosphere. While the temperature was raised to 80° C. by the reaction heat, the reaction was performed until absorption of hydrogen disappeared. The reaction solution was allowed to be cooled and pressurized, and was washed with water to remove the Ziegler-based catalyst. Through vacuum-drying, a hydrogenated product (TPE-1) of the triblock copolymer of polystyrene-polyisoprene-polybutadiene-polystyrene, in Example 1, was obtained.

In addition, each of hydrogenated block copolymers (TPE-2 to TPE-7) in Examples 2 and 3 and Comparative Examples 1 to 4 was obtained in the same manner as in Example 1 except that raw materials and usage amounts thereof were set as noted in Table 1.

400 Nano bay" (Manufactured by Bruker), measurement temperature: 30° C.] was carried out. The amount of vinyl bonds (the sum of contents of 3,4-bond units and 1,2-bond units) was calculated from the ratio of peak areas corresponding to 3,4-bond units and 1,2-bond units in the isoprene structural unit and 1,2-bond units in the butadiene structural unit, to a total peak area of the structural units derived from isoprene and/or butadiene.

(iii) Hydrogenation Rate of Polymer Block (B)

The hydrogenated block copolymer was dissolved in $CDCl_3$ and $^1H$-NMR measurement [device: "ADVANCE 400 Nano bay" (manufactured by Bruker), measurement temperature: 30° C.] was carried out. The hydrogenation rate was calculated from the ratio of a peak area derived from residual olefin of isoprene or butadiene and a peak area derived from ethylene, propylene, butylene, 2-methyl butylene, and 3-methyl butylene.

(iv) Weight Average Molecular Weight (Mw)

Through gel permeation chromatography (GPC) measurement under the following conditions, the weight average molecular weight (Mw) of the hydrogenated block copolymer, in terms of polystyrene, was obtained.

(GPC Measurement Device and Measurement Condition)

Device: GPC device "HLC-8020" (manufactured by Tosoh Corporation)

Separation column: two "TSKgel G4000HX" manufactured by Tosoh Corporation were connected in series.

Eluent: tetrahydrofuran

Eluent flow rate: 0.7 mL/min

TABLE 1

| | | Example | | | | | Comparative Example | | | |
|---|---|---|---|---|---|---|---|---|---|---|
| | Block copolymer | 1<br>TPE-1 | 2<br>TPE-2 | 3<br>TPE-3 | 37<br>TPE-8 | 38<br>TPE-9 | 1<br>TPE-4 | 2<br>TPE-5 | 3<br>TPE-6 | 4<br>TPE-7 |
| Solvent | Cyclohexane | 50 | 50 | 50 | 50 | 50 | 50 | 50 | 50 | 50 |
| Polymerization catalyst | sec-butyl lithium (10% by mass cyclohexane solution) | 0.25 | 0.25 | 0.14 | 0.027 | 0.026 | 0.14 | 0.13 | 0.25 | 0.19 |
| (A) | Styrene (1) | 3.21 | 3.21 | 5.35 | 1.9 | 1.9 | 5.35 | 1.80 | 3.21 | 2.53 |
| | Styrene (2) | 3.21 | 3.21 | 5.35 | 1.9 | 1.9 | 5.35 | 1.80 | 3.21 | 2.53 |
| (B)*1 | Isoprene | 8.24 | 14.98 | 6.00 | 4.90 | 8.80 | 10.70 | 13.20 | 14.98 | 6.50 |
| | Butadiene | 6.74 | — | 4.70 | 3.90 | — | — | — | — | 5.20 |
| Lewis base | Tetrahydrofuran | — | — | — | — | — | 0.29 | 0.29 | — | — |
| | DTHFP*2 | 0.171 | 0.091 | 0.098 | 0.010 | 0.010 | — | — | — | — |

Unless otherwise specified, the unit of usage is kg.
*1Components of polymer block (B) are used as a mixture.
*22,2-di(2-tetrahydrofuryl)propane (Evaluation of Block Copolymer)

In regard to the hydrogenated block copolymers obtained in Examples 1 to 3, and 37 to 38 and Comparative Examples 1 to 4, each physical property was evaluated according to the following measurement method. The results are noted in Table 2.

<Physical Properties of Hydrogenated Block Copolymer>

(i) Content of Polymer Block (A)

The hydrogenated block copolymer was dissolved in $CDCl_3$ and $^1H$-NMR measurement [device: "ADVANCE 400 Nano bay" (manufactured by Bruker), measurement temperature: 30° C.] was carried out. Then, the content of the polymer block (A) was calculated from a peak intensity derived from styrene.

(ii) Amount of Vinyl Bonds of Polymer Block (B)

The block copolymer before hydrogenation was dissolved in $CDCl_3$ and $^1H$-NMR measurement [device: "ADVANCE Sample concentration: 5 mg/10 mL Column temperature: 40° C.

Detector: differential refractometer (RI) detector

Calibration curve: created using standard polystyrene (v) Tan δ (Loss Tangent), Loss Modulus G"

The obtained block copolymer was pressurized at a temperature of 230° C. at a pressure of 10 MPa for 3 min by a press-molding device "NF-50T" (manufactured by Shinto Metal Industries Ltd.) to prepare a sheet with a thickness of 1.0 mm. A test piece was obtained by cutting this sheet into a disk shape with a diameter of 8 mm.

As a measurement device, "ARES-G2" (manufactured by TA instruments) which is a distortion control-type dynamic viscoelasticity device was used in accordance with JIS K7244-10 (2005). The test piece was placed between two flat plates with a diameter of 8 mm, and vibration was applied at a strain amount of 0.1%, at a frequency of 1 Hz.

Then, a test was performed while the temperature was raised at 3° C./min from −70° C. to 100° C.

Figure 2:
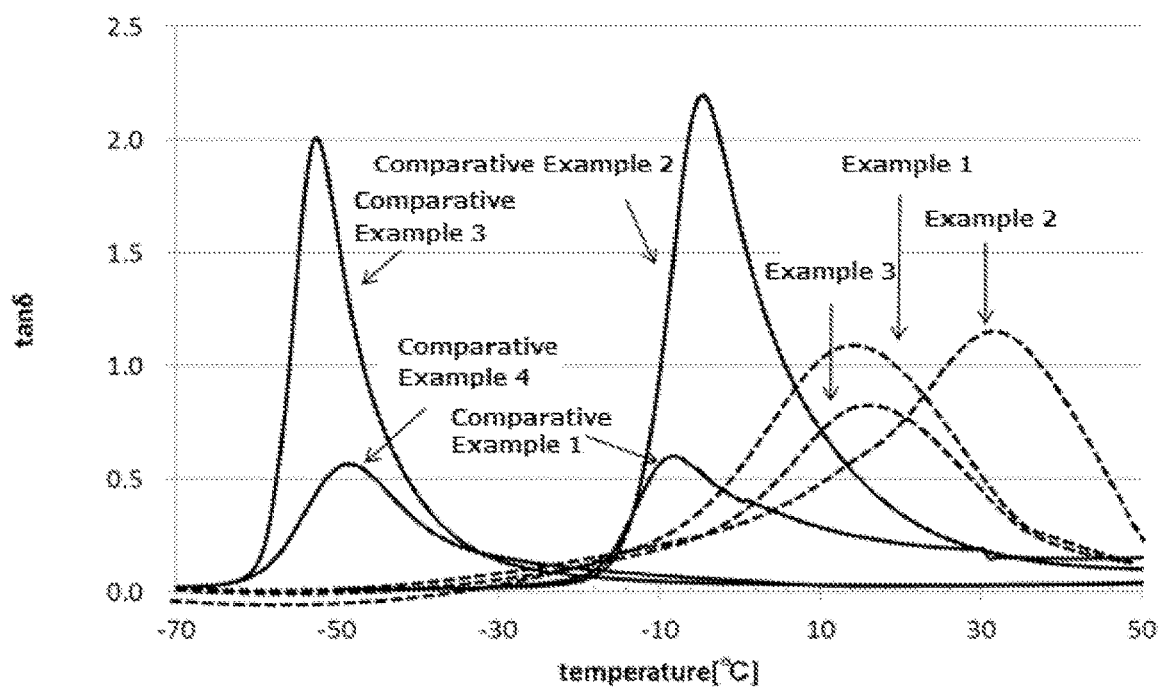
FIG. 2 is a graph representing temperature characteristic peaks of tan δ of block copolymers obtained in Examples 1 to 3 and Comparative Examples 1 to 4.
Figure 3:
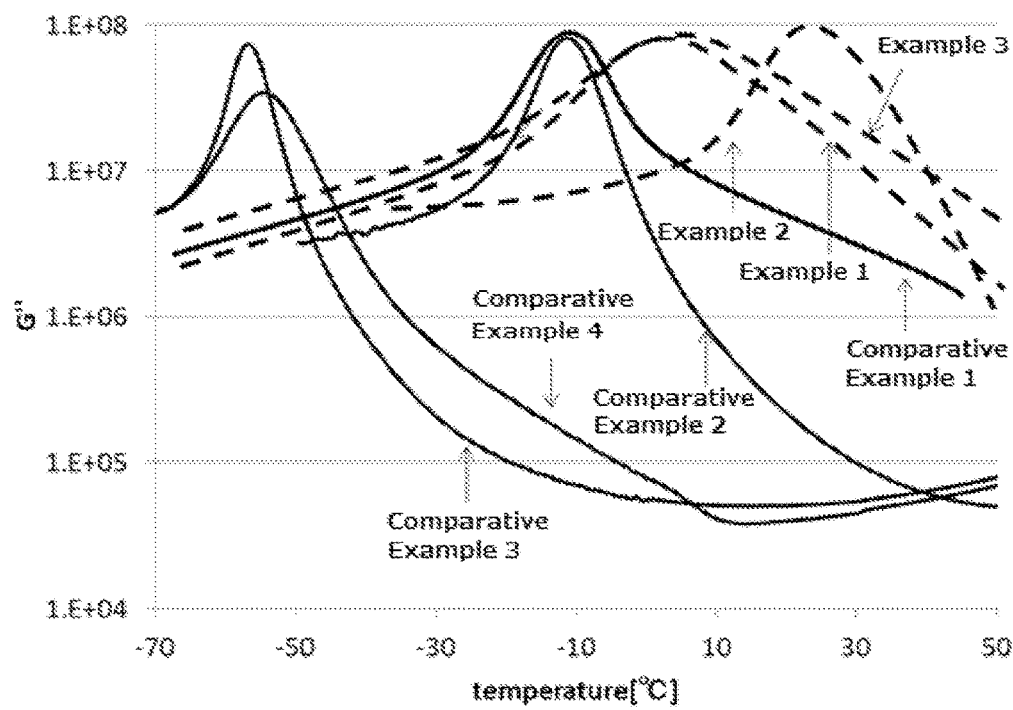
FIG. 3 is a graph representing temperature characteristics of loss moduli G" of block copolymers obtained in Examples 1 to 3 and Comparative Examples 1 to 4.

Through the test, temperature characteristic curves of tan δ and loss modulus G" were created. FIG. 2 illustrates a graph indicating the temperature characteristics of tan δ of the block copolymers obtained in Examples 1 to 3 and Comparative Examples 1 to 4. In addition, FIG. 3 illustrates the temperature characteristics of loss moduli G" in Examples 1 to 3 and Comparative Examples 1 to 4. In FIGS. 2 and 3, the broken line and the solid line correspond to characteristics of Example, and Comparative Example, respectively.

<Measurement of Mobility Parameter M>

First, the relaxation time of the block copolymer was measured by a pulse NMR method. Specifically, the measurement was performed by the following procedure.

Pulse NMR apparatus: Minispec MQ20 manufactured by Bruker Biospin

Measurement method: solid echo method

Measurement condition: The obtained block copolymer was pressurized at a temperature of 230° C., at a pressure of 10 MPa for 3 min by a press-molding device "NF-50T" (manufactured by Shinto Metal Industries Ltd.) to prepare a sheet with a thickness of 1.0 mm. The sheet was cut into a length of 10 mm×a width of 10 mm and placed into a test sample tube to prepare a sample. The sample was kept at 60° C. for 15 min, and then measured under conditions including a pulse width of 7.2 μsec, a pulse interval of 10 μsec, a cumulative number of 60 times, a spin echo repetition time of 1.0 sec, a dummy shot of four times, and a measurement temperature of 60° C. Then, a relaxation curve for spin-spin relaxation of the block copolymer (a relaxation intensity y with respect to a relaxation time x) was created.

Next, in regard to the relaxation curve obtained by the pulse NMR method, coefficients $A_1$ to $A_3$ and spin-spin relaxation times $\tau_1$ to $\tau_3$ of components were determined by performing fitting using the following equation [I] through a least square method. Here, $\tau_1 < \tau_2$. A mobility parameter M, that is a value indicating the mobility of the block (B) of the block copolymer, was calculated by using these numerical values on the basis of the following equation [II].

$$y = A_1 * \exp(-0.5*(x/\tau_1)^2) + A_2 * \exp(-0.5(x/\tau_2)^2) + A_3 * \exp(-x/\tau_3) \quad [I]$$

$$M = (\tau_2 * A_2 + \tau_3 * A_3)/(A_2 + A_3) \quad [II]$$

<Measurement of Loss Factor in Non-Restraint Type>

The block copolymer obtained in Examples 1 to 3 and Comparative Examples 1 to 4 was pressurized by a press-molding device "NF-50T" (manufactured by Shinto Metal Industries Ltd.), at a temperature of 230° C., at a pressure of 10 MPa for 3 min to prepare a sheet with a thickness of 1 mm. The sheet was cut into a width of 10 mm×a length of 250 mm×a thickness of 1 mm, and was bonded to a steel plate (material: SECC) with a width of 10 mm×a length of 250 mm×a thickness of 0.8 mm by using a cyanoacrylate-based adhesive. Then, a non-restraint type laminate was prepared and was set as a measurement sample.

Next, the sample was set in a loss factor measurement system (manufactured by Brüel & Kjær, vibration exciter type 4809; impedance head type 8001; charge converter type 2647A). Specifically, the steel plate side in the central portion of the sample was fixed to the tip portion of an excitation force detector built in an impedance head of a vibration exciter of the device. Then, while vibration was applied to the central portion of the sample at a frequency ranging from 0 to 8,000 Hz, the damping test for the measurement sample was carried out according to the central vibration method, and an excitation force in the central portion and an acceleration signal indicating an acceleration waveform were detected. The measurement was performed on each sample at temperatures of 20° C. and 40° C.

Figure 4:
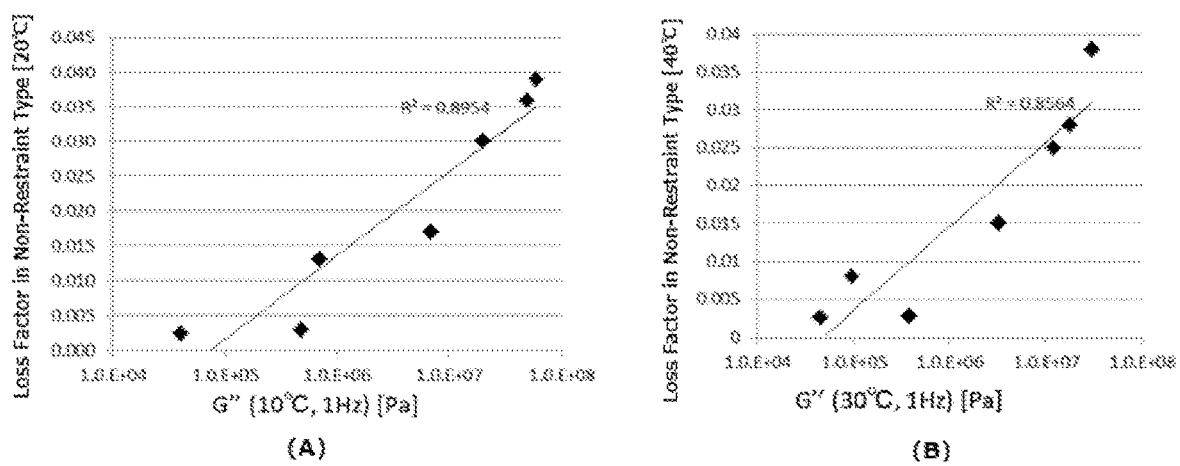
FIG. 4 is a graph representing correlation between a loss factor in a non-restraint type and a loss modulus G".

On the basis of the obtained excitation force and a speed signal obtained by integrating the acceleration signal, a mechanical impedance at the excitation point (the central portion of the laminate to which vibration was applied) was obtained. Then, an impedance curve obtained by the frequency (as a horizontal axis) and the mechanical impedance (as a vertical axis) was created. From the full width at half maximum of the second peak ($2^{nd}$ mode) counted from the low frequency side, the loss factor of the laminate as the measurement sample, for the non-restraint type vibration damping material, at each temperature, (hereinafter, also referred to as "loss coefficient in non-restraint type") was obtained. FIG. 4 is a graph illustrating the correlation between the loss factor in the non-restraint type and the loss modulus G", regarding each of Examples and Comparative Examples described above. FIG. 4(A) illustrates the correlation between the loss factor in the non-restraint type at 20° C. and the loss modulus G" at 10° C., and FIG. 4(B) illustrates the correlation between the loss factor in the non-restraint type at 40° C. and the loss modulus G" at 30° C. In FIG. 4, the straight line is an approximate straight line by the least square method, and R is a correlation coefficient.

TABLE 2

| | | Example | | | | |
|---|---|---|---|---|---|---|
| | | 1 | 2 | 3 | 37 | 38 |
| | Used block copolymer | TPE-1 | TPE-2 | TPE-3 | TPE-8 | TPE-9 |
| Physical properties of block copolymer | Constituent monomer of polymer block (A) | St | St | St | St | St |
| | Constituent monomer of polymer block (B) | Ip/Bd | Ip | Ip/Bd | Ip/Bd | Ip |
| | Mass ratio of constituent monomer of polymer block(B) | 55/45 | 100 | 55/45 | 55/45 | 100 |
| | Polymer structure | A-B-A | A-B-A | A-B-A | A-B-A | A-B-A |
| | Content [% by mass] of polymer block (A) - Condition (1) | 30 | 30 | 50 | 30 | 30 |
| | Weight average molecular weight of block copolymer or hydrogenated product | 70,000 | 85,000 | 150,000 | 320,000 | 340,000 |
| | Hydrogenation rate [mol %] of polymer block (B) - Condition (6) | 93 | 90 | 92 | 96 | 90 |
| | Amount of vinyl bonds [mol %] of polymer block (B) - Condition (5) | 81 | 80 | 78 | 80 | 82 |

TABLE 2-continued

|  | Temperature [° C.] at peak position of tan δ - Condition (3) | 14 | 32 | 15 | 15 | 33 |
|---|---|---|---|---|---|---|
|  | Maximum width [° C.] of temperature regions where tan δ ≥ 1 - Condition (2) | 11 | 12 | 0 | 0 | 0 |
|  | Peak intensity of tan δ at 0 ~+50° C. - Condition (8) | 1.1 | 1.2 | 0.8 | 0.9 | 0.8 |
|  | Value [Pa] of G" at 10° C., 1 Hz - Condition (7) | $5.0 \times 10^7$ | $2.0 \times 10^7$ | $6.0 \times 10^7$ | $5.2 \times 10^7$ | $2.2 \times 10^7$ |
|  | Value [Pa] of G" at 30° C., 1 Hz - Condition (7) | $1.2 \times 10^7$ | $3.0 \times 10^7$ | $1.8 \times 10^7$ | $1.3 \times 10^7$ | $3.3 \times 10^7$ |
|  | Mobility parameter M - Condition (4) | 0.151 | 0.039 | 0.138 | 0.147 | 0.036 |
|  | Loss factor in Non-restraint type (20° C., 2nd mode) | 0.036 | 0.030 | 0.039 | 0.038 | 0.032 |
|  | Loss factor in Non-restraint type (40° C., 2nd mode) | 0.025 | 0.038 | 0.028 | 0.028 | 0.039 |

|  |  | Comparative Example | | | |
|---|---|---|---|---|---|
|  |  | 1 | 2 | 3 | 4 |
|  | Used block copolymer | TPE-4 | TPE-5 | TPE-6 | TPE-7 |
| Physical properties of block copolymer | Constituent monomer of polymer block (A) | St | St | St | St |
|  | Constituent monomer of polymer block (B) | Ip | Ip | Ip | Ip/Bd |
|  | Mass ratio of constituent monomer of polymer block(B) | 100 | 100 | 100 | 55/45 |
|  | Polymer structure | A-B-A | A-B-A | A-B-A | A-B-A |
|  | Content [% by mass] of polymer block (A) - Condition (1) | 50 | 20 | 30 | 20 |
|  | Weight average molecular weight of block copolymer or hydrogenated product | 150,000 | 125,000 | 80,000 | 110,000 |
|  | Hydrogenation rate [mol %] of polymer block (B) - Condition (6) | 88 | 88 | 99 | 99 |
|  | Amount of vinyl bonds [mol %] of polymer block (B) - Condition (5) | 60 | 60 | 7 | 7 |
|  | Temperature [° C.] at peak position of tan δ Condition (3) | −8 | −7 | −48 | −49 |
|  | Maximum width [° C.] of temperature regions where tan δ ≥ 1 - Condition (2) | 0 | 15 | 5.5 | 0 |
|  | Peak intensity of tan δ at 0~ +50° C. - Condition (8) | *0 | —*3 | —*3 | —*3 |
|  | Value [Pa] of G" at 10° C., 1 Hz - Condition (7) | $6.8 \times 10^6$ | $7.0 \times 10^5$ | $4.8 \times 10^5$ | $4.0 \times 10^4$ |
|  | Value [Pa] of G" at 30° C., 1 Hz - Condition (7) | $3.3 \times 10^6$ | $9.7 \times 10^4$ | $3.8 \times 10^5$ | $4.5 \times 10^4$ |
|  | Mobility parameter M - Condition (4) | 0.276 | 0.296 | 0.501 | 0.503 |
|  | Loss factor in Non-restraint type (20° C., 2nd mode) | 0.017 | 0.013 | 0.0029 | 0.0024 |
|  | Loss factor in Non-restraint type (40° C., 2nd mode) | 0.015 | 0.008 | 0.0028 | 0.0026 |

*[3] Peak of tan δ was not present at 0 to +50° C.

<Explanation of Abbreviations in Table 2>
St: styrene
Bd: butadiene
Ip: isoprene Examples 4 and 5, Comparative Examples 5 to 7

Each of the block copolymers TPE-2 to TPE-6 was blended with polypropylene (PP) at a mass ratio noted in Table 3 below, and melt-kneaded at 200° C. by using a twin-screw extruder to obtain a polypropylene composition. As polypropylene, "Prime Polypro F327" (melt flow rate (MFR) [230° C., load of 2.16 kg (21 N)]=7 g/10 min, manufactured by Prime Polymer Co., Ltd.) was used.

The obtained polypropylene composition pellet was injection-molded by an injection molding machine ("EC75SX", manufactured by Toshiba Machine Co., Ltd.) to prepare a sheet with a length of 200 mm×a width of 40 mm×a thickness of 2 mm. The sheet was cut into a width of 10 mm×a length of 200 mm×a thickness of 2 mm to obtain a sample.

Next, the sample was set in a loss factor measurement system (manufactured by Brüel & Kjær, complex elastic modulus measurement device ME3930; electromagnetic vibration exciter MM0002; impedance box MH9123-D). Specifically, one side end of the sample was fixed to the upper portion of the complex elastic modulus measurement device. Then, while vibration was applied to the opposite end of the sample at a frequency ranging from 0 to 8,000 Hz, the damping test for the measurement sample was carried out by a cantilever method, and an excitation force at the end and an acceleration signal indicating an acceleration waveform were detected. The measurement was performed on each sample at a temperature of 40° C.

On the basis of the obtained excitation force and a speed signal obtained by integrating the acceleration signal, a mechanical impedance at the excitation point (the central portion of the laminate to which vibration was applied) was obtained. Then, an impedance curve obtained by the frequency (as a horizontal axis), and the mechanical impedance (as a vertical axis) was created. From the full width at half maximum of the second peak (2nd mode) counted from the low frequency side, the loss factor of the resin composition as the measurement sample at 40° C. was obtained.

TABLE 3

|  | Example 4 | Example 5 | Comparative Example 5 | Comparative Example 6 | Comparative Example 7 |
|---|---|---|---|---|---|
| PP | 90 | 90 | 90 | 90 | 90 |
| TPE-2 | 10 | — | — | — | — |
| TPE-3 | — | 10 | — | — | — |
| TPE-4 | — | — | 10 | — | — |
| TPE-5 | — | — | — | 10 | — |
| TPE-6 | — | — | — | — | 10 |
| Loss factor (40° C.) | 0.09 | 0.08 | 0.06 | 0.06 | 0.05 |

As is clear from the results in Table 2, the block copolymers in Examples 1 to 3 exhibit an excellent vibration damping property for the non-restraint type vibration damping material because the peak of tan δ falls within a range of 0° C. to +50° C., the maximum width of a series of temperature regions in which tan δ is 1.0 or more is less than 16° C., and the mobility parameter M falls within a range of 0.01 to 0.25 sec. In addition, in the illustration, the block copolymer of Example has an excellent vibration damping property for the non-restraint type vibration damping material in a temperature region covering a wide range of actual use because both the loss modulus G" at 10° C. and 1 Hz, and the loss modulus G" at 30° C., and 1 Hz are $7.0 \times 10^6$ Pa or more. In addition, as is clear from the results of Table 3, PP (Examples 4, and 5) to which the block copolymer of Examples 2 and 3 was added has a higher loss factor at 40° C. than PP (Comparative Examples 5 to 7) to which the block copolymer of Comparative Examples 1 to 3 was added. That is, it can be found that the former exhibits a higher vibration damping property at a relatively high temperature than the latter.

Meanwhile, the block copolymers in Comparative Examples 1 to 4 are inferior to those in Examples 1 to 3, in the vibration damping property for the non-restraint type vibration damping material, because although the maximum width of a series of temperature regions where tan δ is 1.0 or more is less than 16° C., the peak of tan δ does not fall within a range of 0° C. to +50° C., the mobility parameter M is also out of the range of 0.01 to 0.25 sec, and the loss factor at 20° C. and 40° C. is small. In addition, in the illustration, the block copolymers in Comparative Examples 1 to 4 are inferior to those in Examples, in the vibration damping property for the non-restraint type vibration damping material in a temperature region covering a wide range of actual use, because both the loss modulus G" at 10° C. and 1 Hz, and the loss modulus G" at 30° C., and 1 Hz are less than $7.0 \times 10^6$ Pa. In particular, in Comparative Example 2, the temperature region where tan δ≥1 is relatively wide, and it is expected that a restraint type exhibits a certain performance, but the loss factor in the non-restraint type is small, and thus it can be found that an actual use for the non-restraint type is difficult.

Examples 6 and 7, Comparative Example 8

Each of the block copolymers TPE-1, TPE-2, and TPE-7 was blended with polypropylene-2 (PP-2) at a mass ratio noted in Table 4 below, and melt-kneaded at 200° C. by using a twin-screw extruder to obtain a resin composition. As PP-2, "Hypro-G PP-HP12" (homo polypropylene, MFR [230° C., load of 2.16 kg (21 N)]=12 g/10 min, manufactured by Entec Polymers) was used.

The tan δ of the obtained composition was measured in accordance with JIS K7244-4 (1999). Specifically, the obtained composition was injection-molded by an injection molding machine ("EC75SX", manufactured by Toshiba Machine Co., Ltd.) to prepare a sheet with a length of 50 mm×a width of 30 mm×a thickness of 1 mm. The sheet was cut into a width of 5 mm×a length of 30 mm×a thickness of 1 mm to obtain a sample.

Then, on this sample, the intensity of tan δ in a tensile mode at 0, 20, and 40° C. was measured by using a dynamic viscoelastometer manufactured by Hitachi High-Tech Science Corporation, under conditions including a measurement temperature of −80° C. to 100° C., a frequency of 10 Hz.

In addition, in accordance with JIS K7161 (2014), the tensile strength [MPa], the tensile fracture elongation [%], and the tensile elastic modulus [MPa] of each sample were measured. Specifically, the obtained polypropylene composition was injection-molded to prepare a JIS multipurpose test piece A1, and then, the tensile strength [MPa], the tensile fracture elongation [%], and the tensile elastic modulus [MPa] were measured by using a universal material tester 5566 type manufactured by Instron.

Further, the resin composition obtained in Examples 6 and 7 and Comparative Example 8 was used to prepare a test piece for hardness measurement (a size of 30 mm×25 mm×a thickness of 5 mm). In accordance with JIS K6253 (2012), a durometer hardness test was performed by using a durometer hardness meter type AGS-619R-G (manufactured by TECLOCK Co., Ltd.) so as to measure the shore A hardness.

Further, the MFR was measured in accordance with JIS K7210 (2014) by using the resin composition obtained in Examples 6 and 7 and Comparative Example 8.

The measurement results are noted in Table 4 below. For reference, Table 4 also illustrates measurement data in the case of only PP-2 in Reference Example 1. The numerical value of the MFR in Reference Example 1 is slightly different from the catalog value of the product used as PP-2, but this is considered to be caused by a measurement error.

TABLE 4

|  |  | Reference Example 1 | Example 6 | Example 7 | Comparative Example 8 |
|---|---|---|---|---|---|
| Resin composition [part by mass] | Polypropylene-2 | 100 | 90 | 90 | 90 |
|  | TPE-1 | — | 10 | — | — |
|  | TPE-2 | — | — | 10 | — |
|  | TPE-7 | — | — | — | 10 |

TABLE 4-continued

|  |  | Reference Example 1 | Example 6 | Example 7 | Comparative Example 8 |
|---|---|---|---|---|---|
| tan δ (tensile mode, 10 Hz) | 0° C. | 0.17 | 0.24 | 0.18 | 0.16 |
|  | 20° C. | 0.14 | 0.45 | 0.35 | 0.14 |
|  | 40° C. | 0.14 | 0.23 | 0.36 | 0.15 |
| Tensile strength [MPa] |  | 31.5 | 30.3 | 31.0 | 27.0 |
| Tensile fracture elongation [%] |  | 99 | 104 | 106 | 75 |
| Tensile elastic modulus [MPa] |  | 806 | 940 | 975 | 767 |
| Hardness (Shore A) |  | 94.8 | 97.0 | 98.0 | 95.8 |
| MFR (230° C., 2.16 kg) |  | 11.3 | 9.3 | 9.8 | 8.0 |

As noted in Table 4, in the compositions of Examples 6 and 7, which were prepared by using the block copolymers of Examples 1 and 2, the tensile fracture elongation, the tensile elastic modulus, and the hardness are high as compared to those in the composition of Comparative Example 8, which was prepared by using the block copolymer of Comparative Example 4, or the composition in Reference Example 1, which does not contain any block copolymer, and also, the tensile strength and the MFR value are large as compared to those in the composition of Comparative Example 8. In addition, it is determined that the compositions of Examples 6 and 7 are excellent in the mechanical properties or the fluidity at the time of melting, and also have a larger value of tan δ in a temperature range of 0° C. to 40° C. than the composition of Comparative Example 8 or Reference Example 1, and thus exhibit a high vibration damping property in a wide temperature range from a low temperature to a relatively high temperature.

Examples 8 and 9, Comparative Example 9

Each of the block copolymers TPE-1, TPE-2, and TPE-7 was blended with a tackifier resin and hydrogenated paraffin oil at a mass ratio noted in Table 5 below, and melt-kneaded at 200° C. by using a twin-screw extruder to obtain a hydrogenated block copolymer composition (adhesive material). As the tackifier resin, "ARKON P-125" (manufactured by Arakawa Chemical Industries, Ltd.) was used, and as the hydrogenated paraffin oil, "Diana Process Oil PW-32" (kinematic viscosity at 40° C.: 31 mm²/s, manufactured by Idemitsu Kosan Co., Ltd.) was used.

The tan δ of the obtained composition was measured in accordance with JIS K7244-10 (2005). Specifically, the obtained resin composition was injection-molded by an injection molding machine ("EC75SX", manufactured by Toshiba Machine Co., Ltd.) to prepare a sheet with a length of 50 mm×a width of 30 mm×a thickness of 1 mm. The sheet was cut into a disk shape with a diameter of 8 mm to obtain a sample. By using a distortion control-type dynamic viscoelasticity device "ARES-G2" (manufactured by TA instruments), the sample was placed between flat plates with a diameter of 8 mm, and vibration was applied at a strain amount of 0.1%, at a frequency of 1 Hz. While the temperature was raised at 3° C./min from −70° C. to 100° C., the intensity of tan δ at 0, 20, and 40° C. was measured through shear mode measurement.

In addition, a stainless steel (SUS) plate with a length of 75 mm×a width of 25 mm×a thickness of 1 mm, the composition sheet prepared as described above, and a polyethylene terephthalate (PET) sheet with a thickness of 50 μm were stacked in this order. This was placed at the central portion of a metallic spacer (outer dimension: 200 mm×200 mm, inner dimension: 150 mm×150 mm, and thickness: 2 mm). The stacked sheet and the metallic spacer were interposed between sheets made of polytetrafluoroethylene, and further interposed between metal plates from the outside, and then compression-molded by using a compression molding machine for 3 min at a load of 20 kgf/cm² under a condition of a temperature of 160° C. Therefore, a laminate composed of PET/block copolymer composition/SUS plate was obtained.

On the laminate prepared as described above, a peeling adhesive strength test at 40° C. was carried out by using "Instron 5566" manufactured by Instron in accordance with JIS K6854-2 under conditions including a contact angle of 180°, and a tensile speed of 100 mm/min, so as to measure the adhesive strength (peeling strength).

The measurement results are noted in Table 5 below.

TABLE 5

|  |  | Example 8 | Example 9 | Comparative Example 9 |
|---|---|---|---|---|
| Copolymer composition [part by mass] | TPE-1 | 40 | — |  |
|  | TPE-2 | — | 40 |  |
|  | TPE-7 | — | — | 40 |
|  | Tackifier resin | 40 | 40 | 40 |
|  | Hydrogenated paraffin oil | 20 | 20 | 20 |
| tan δ (shear mode, 1 Hz) | 0° C. | 0.5 | 0.2 | 0.04 |
|  | 20° C. | 2.1 | 1.7 | 0.02 |
|  | 40° C. | 0.4 | 1.8 | 0.03 |
| 40° C. peeling strength to SUS [N/25 mm] |  | 17 | 23 | 6 |

As is clear from Table 5, the compositions of Examples 8 and 9, which were prepared by using the block copolymers of Examples 1 and 2, exhibit a higher tan δ at 0 to 40° C. than the composition of Comparative Example 9, which was prepared by using the block copolymer of Comparative Example 4, and are excellent in the peeling strength at 40° C. The compositions of Examples 8 and 9 may be suitably used as a sticking adhesive agent having a vibration damping property in a wide temperature range.

Examples 10 and 11, Comparative Example 10

Each of the block copolymers TPE-1, TPE-2, and TPE-7, and hydrogenated paraffin oil were blended at a mass ratio noted in Table 6 below, and melt-kneaded at 200° C. by using a twin-screw extruder to obtain a hydrogenated block copolymer composition. As the hydrogenated paraffin oil, "Diana process oil PW-32" (manufactured by Idemitsu Kosan Co., Ltd.) was used.

On the obtained composition, by the same procedure as in Example 8, tan δ in a shear mode at 0, 20, and 40° C. was measured under conditions including a measurement temperature of −70° C. to 100° C., and a frequency of 1 Hz.

Measurement results are noted in Table 6 below.

TABLE 6

|  |  | Example 10 | Example 11 | Comparative Example 10 |
|---|---|---|---|---|
| Copolymer composition [part by mass] | TPE-1 | 90 | — | — |
|  | TPE-2 | — | 90 | — |
|  | TPE-7 | — | — | 90 |
|  | Hydrogenated paraffin oil | 10 | 10 | 10 |
| tan δ (shear mode, 1 Hz) | 0° C. | 0.2 | 0.1 | 0.04 |
|  | 20° C. | 1.3 | 1.8 | 0.03 |
|  | 40° C. | 0.3 | 0.5 | 0.04 |

As is clear from Table 6, it can be found that the compositions of Examples 10 and 11, which were prepared by using the block copolymers of Examples 1 and 2, exhibit a higher tan δ at 0 to 40° C. than the composition of Comparative Example 10, which was prepared by using the block copolymer of Comparative Example 4, and thus are excellent in the vibration damping and the shock absorption. Therefore, the compositions of Examples 10 and 11 may be suitably used for a cushioning material or the like of a shoe sole.

Examples 12 and 13, Comparative Example 11

Each of the block copolymers TPE-1, TPE-2, and TPE-7, glass fiber, polypropylene-3 (PP-3) and polypropylene-4 (PP-4) were blended at a mass ratio noted in Table 7 below, and were melt-kneaded at 200° C. by using a twin-screw extruder to obtain a resin composition containing the glass fiber. As the glass fiber, "chopped strand T-480" manufactured by Nippon Electric Glass Co., Ltd. was used, and side-fed from the middle of the twin-screw extruder. As PP-3, block polypropylene "Prime Polypro J705UG" (manufactured by Prime Polymer Co., Ltd.) was used, and as PP-4, ADMER QE840 manufactured by Mitsui Chemicals, Inc. was used.

The obtained composition was injection-molded by an injection molding machine ("EC75SX", manufactured by Toshiba Machine Co., Ltd.) to prepare a sheet with a length of 200 mm×a width of 40 mm×a thickness of 2 mm. The sheet was cut into a width of 10 mm×a length of 200 mm×a thickness of 2 mm, and to its central portion, a contact tip adhered by using an adhesive containing α-cyanoacrylate as a main component so as to obtain a sample.

Next, the sample was set in a loss factor measurement system (manufactured by Brüel & Kjær, vibration exciter type 4809; impedance head type 80001). The contact tip adhering to the central portion of the sample was attached to the tip portion of an excitation force detector built in an impedance head. While vibration was applied to the central portion of the laminate at a frequency ranging from 0 to 8,000 Hz, the damping test was carried out through a central vibration method by detecting an excitation force and an acceleration waveform at this point. Then, an excitation force in the central portion and an acceleration signal indicating an acceleration waveform were detected. The measurement was performed on each sample at temperatures of 0° C., 20° C., 40° C., 60° C., 80° C., and 100° C.

On the basis of the obtained excitation force and a speed signal obtained by integrating the acceleration signal, a mechanical impedance at the excitation point (the central portion of the sample to which vibration was applied) was obtained. Then, an impedance curve obtained by the frequency (as a horizontal axis) and the mechanical impedance (as a vertical axis) was created. From the full width at half maximum of the second peak ($2^{nd}$ mode) counted from the low frequency side, the loss factor of each sample at each temperature was obtained. The larger the value of the loss factor, the higher the damping effect.

In addition, in regard to the compositions obtained in Examples 12 and 13 and Comparative Example 11, the tensile strength [MPa] and the tensile fracture elongation [%] were measured in the same manner as in Example 6.

Further, each composition was injection-molded by an injection molding machine ("EC75SX", manufactured by Toshiba Machine Co., Ltd.) to prepare a JIS multipurpose test piece A1. By using its central portion (length 80 mm×width 10 mm×thickness 4 mm), a flexural strength test was carried out in accordance with JIS K7171 (ISO178) by using a universal tester (manufactured by Instron, 5566 type) so as to measure the flexural strength [MPa] and the flexural modulus [MPa].

The results are noted in Table 7. For reference, Table 7 also illustrates measured values in the case where the hydrogenated block copolymer is not contained (that is, in the case of only PP-3, PP-4 and glass fiber) in Reference Example 2.

TABLE 7

| | | Reference Example 2 | Example 12 | Example 13 | Comparative Example 11 |
|---|---|---|---|---|---|
| Resin composition [part by mass] | Polypropylene-3 | 68 | 58 | 58 | 58 |
| | Polypropylene-4 | 2 | 2 | 2 | 2 |
| | Glass fiber | 30 | 30 | 30 | 30 |
| | TPE-1 | — | 10 | — | — |
| | TPE-2 | — | — | 10 | — |
| | TPE-7 | — | — | — | 10 |
| Loss factor (0° C.) | | 0.0291 | 0.038 | 0.020 | 0.0293 |
| Loss factor (20° C.) | | 0.0361 | 0.068 | 0.036 | 0.0315 |
| Loss factor (40° C.) | | 0.0255 | 0.044 | 0.060 | 0.0280 |
| Loss factor (60° C.) | | 0.0289 | 0.033 | 0.043 | 0.0231 |
| Loss factor (80° C.) | | 0.0222 | 0.032 | 0.033 | 0.0248 |
| Loss factor (100° C.) | | 0.0263 | 0.037 | 0.038 | 0.0306 |
| Tensile strength [MPa] | | 74.0 | 69.6 | 71.2 | 61.6 |
| Tensile fracture elongation [%] | | 2.0 | 2.7 | 2.3 | 3.1 |
| Flexural strength [MPa] | | 117.8 | 105.5 | 110.3 | 95.5 |
| Flexural modulus [MPa] | | 6390 | 5520 | 5780 | 5260 |

As is clear from Table 7, in the compositions of Examples 12 and 13, which were prepared by using the block copolymers of Examples 1 and 2, the tensile fracture elongation is high as compared to that in the composition of Comparative Example 11, which was prepared by using the block copolymer of Comparative Example 4, or the composition in Reference Example 2, which does not contain any block copolymer, and also, values of the tensile strength, the flexural strength, and the flexural modulus are large as compared to those in the composition of Comparative Example 11. Further, it can be found that the compositions of Examples 12 and 13 have a higher loss factor value in a wide temperature range of 20° C. to 100° C. than the composition of Comparative Example 11 or Reference Example 2, and thus exhibit a high vibration damping property in a wide temperature range from a normal temperature to a high temperature. In particular, it can be found that the composition of Example 12 has a higher loss factor value even at 0° C. than the composition of Comparative Example 11 or the composition of Reference Example 2, and thus exhibits a high vibration damping property even at a low temperature.

Examples 14 and 15, Comparative Example 12

Each of the block copolymers TPE-1, TPE-2, and TPE-7 was blended with polyethylene at a mass ratio noted in Table 8 below, and melt-kneaded at 200° C. by using a twin-screw extruder to obtain a resin composition. As polyethylene, "Hypel PEHD 8" (high density polyethylene, MFR [190° C., load of 2.16 kg (21 N)] 6.6/10 min, manufactured by Entec Polymers) was used.

On the obtained composition, under conditions including a measurement temperature of −80° C. to 100° C., and a frequency of 10 Hz, the intensity of tan δ in a tensile mode at 0, 20, and 40° C., the tensile strength [MPa], the tensile fracture elongation [%], and the shore A hardness were measured by the same procedure as described above in Example 6. In addition, the MFR was measured by the same procedure as in Example 6 except that the temperature was changed to 190° C.

The measurement results are noted in Table 8 below. For reference, Table 8 also illustrates measurement data in the case of only polyethylene in Reference Example 3.

TABLE 8

| | | Reference Example 3 | Example 14 | Example 15 | Comparative Example 12 |
|---|---|---|---|---|---|
| Resin composition [part by mass] | Polyethylene | 100 | 90 | 90 | 90 |
| | TPE-1 | — | 10 | — | — |
| | TPE-2 | — | — | 10 | — |
| | TPE-7 | — | — | — | 10 |
| tan δ (tensile mode, 10 Hz) | 0° C. | 0.17 | 0.24 | 0.18 | 0.16 |
| | 20° C. | 0.14 | 0.45 | 0.33 | 0.14 |
| | 40° C | 0.14 | 0.23 | 0.35 | 0.15 |
| Tensile strength [MPa] | | 19.8 | 24.3 | 24.4 | 22.8 |
| Tensile fracture elongation [%] | | 222 | 835 | 824 | 784 |
| Hardness (Shore A) | | 96 | 97 | 97 | 95 |
| MFR (190° C., 2.16 kg) | | 6.6 | 5.8 | 5.6 | 4.5 |

As is clear from Table 8, the compositions of Examples 14 and 15, which were prepared by using the block copolymers of Examples 1 and 2, have higher values of the tensile strength, the tensile fracture elongation, and the hardness than the composition of Comparative Example 12, which was prepared by using the block copolymer of Comparative Example 4, or the composition in Reference Example 3, which does not contain any block copolymer, and also, have a larger MFR value than the composition of Comparative Example 12. Further, it can be found that the compositions of Examples 14 and 15 have a larger value of tan δ in a temperature range of 0° C. to 40° C. than the composition of Comparative Example 12 or Reference Example 3, and thus exhibit a high vibration damping property in a wide temperature region from a low temperature to a relatively high temperature.

Examples 16 to 18, Comparative Example 13

Each of the block copolymers TPE-1, TPE-2, and TPE-7, ethylenepropylene diene rubber (EPDM), ethylene vinyl acetate copolymer (EVA), filler 1, filler 2 and plasticizer were blended at a mass ratio noted in Table 9 below, and were melt-mixed at a temperature of 120° C. by using a kneader to obtain a master batch.

A cross-linking agent and a foaming agent were added to the obtained master batch at a mass ratio noted in Table 9 below. This was roll-kneaded at a roll temperature of 110° C. to obtain a resin composition. The obtained composition was pressed at 164° C. for 15 min by using a mold with a thickness of 10 mm to obtain a foam molded body.

As the EPDM, "Esprene 501 A" manufactured by Sumitomo Chemical Co., Ltd. was used.

As the EVA, "ULTRASEN 640" manufactured by Tosoh Corporation was used.

As the cross-linking agent, a peroxide-based cross-linking agent (product name "Perkadox 14/40", manufactured by Kayaku Akzo Corporation) (a mixture composed of bis(t-butyldioxyisopropyl)benzene (40% by mass), calcium carbonate (55.3% by mass), and amorphous silica diluted product (4.7% by mass)) was used.

As the foaming agent, an azodicarboxylic acid amide-based composite foaming agent (product name "Cellmic CAP-500", manufactured by Sankyo Kasei Co., Ltd.) (decomposition temperature: 155° C., amount of gas: 160 mL/g) was used.

As the filler 1, calcium carbonate was used.
As the filler 2, carbon black was used.
As the plasticizer, "Diana process oil PW-380" manufactured by Idemitsu Kosan Co., Ltd. was used.

On the obtained composition, under conditions including a measurement temperature of −80° C. to 100° C., and a frequency of 10 Hz, the intensity of tan δ in a tensile mode at 0, 20, and 40° C. was measured by the same procedure as described above in Example 6.

The measurement results are noted in Table 9 below. For reference, Table 9 also illustrates measurement data in the case where only the EPDM, the cross-linking agent, the foaming agent, the filler 1, the filler 2 and the plasticizer are used, in Reference Example 4.

As is clear from Table 9, it can be found that the compositions of Examples 16 to 18, which were prepared by using the block copolymers of Examples 1 and 2, have a higher value of tan δ in a temperature range of 0° C. to 40° C. than the composition of Comparative Example 13, which was prepared by using the block copolymer of Comparative Example 4, or the composition of Reference Example 4, which does not contain any block copolymer, and thus, exhibit a high vibration damping property in a wide temperature range from a low temperature to a relatively high temperature.

Examples 19 and 20, Comparative Example 14

Each of the block copolymers TPE-1, TPE-2, and TPE-7 was blended with an olefin-based cross-linked thermoplastic elastomer (TPV) at a mass ratio noted in Table 10 below, and melt-kneaded at 230° C. by using a twin-screw extruder to obtain a resin composition. As the TPV, "Santoprene 201-55" (MFR [230° C., load of 2.16 kg (21 N)] 3.1 g/10 min, manufactured by ExxonMobil) was used.

On the obtained composition, under conditions including a measurement temperature of −80° C. to 100° C., and a frequency of 10 Hz, the intensity of tan δ in a tensile mode at 0, 20, and 40° C., the tensile strength [MPa], the tensile fracture elongation [%], the shore A hardness, and the MFR were measured by the same procedure as described above in Example 6.

The measurement results are noted in Table 10 below. For reference, Table 10 also illustrates measurement data in the case of only TPV, in Reference Example 5.

TABLE 9

| | | Reference Example 4 | Example 16 | Example 17 | Example 18 | Comparative Example 13 |
|---|---|---|---|---|---|---|
| Resin composition [part by mass] | EPDM | 34 | 24 | 24 | — | 24 |
| | EVA | — | — | — | 24 | — |
| | TPE-1 | — | 30 | — | — | — |
| | TPE-2 | — | — | 30 | 30 | — |
| | TPE-7 | — | — | — | — | 30 |
| | Cross-linking agent | 0.7 | 0.7 | 0.7 | 0.7 | 0.7 |
| | Foaming agent | 5 | 5 | 5 | 5 | 5 |
| | Filler 1 | 20 | 14 | 14 | 14 | 14 |
| | Filler 2 | 20 | 14 | 14 | 14 | 14 |
| | Plasticizer | 20 | 14 | 14 | 14 | 14 |
| tan δ (tensile mode, 10 Hz) | 0° C. | 0.18 | 0.32 | 0.23 | 0.26 | 0.17 |
| | 20° C. | 0.15 | 1.01 | 0.69 | 0.71 | 0.16 |
| | 40° C. | 0.15 | 0.41 | 0.72 | 0.73 | 0.15 |

TABLE 10

| | | Reference Example 5 | Example 19 | Example 20 | Comparative Example 14 |
|---|---|---|---|---|---|
| Resin composition [part by mass] | TPV | 100 | 90 | 90 | 90 |
| | TPE-1 | — | 10 | — | — |
| | TPE-2 | — | — | 10 | — |
| | TPE-7 | — | — | — | 10 |
| tan δ (tensile mode, 10 Hz) | 0° C. | 0.15 | 0.22 | 0.18 | 0.14 |
| | 20° C. | 0.13 | 0.41 | 0.30 | 0.14 |
| | 40° C. | 0.13 | 0.19 | 0.31 | 0.13 |
| Tensile strength [MPa] | | 3.4 | 3.4 | 3.4 | 3.2 |
| Tensile fracture elongation [%] | | 202 | 385 | 391 | 262 |
| Hardness (Shore A) | | 60.0 | 59.0 | 58.0 | 59.8 |
| MFR (230° C., 2.16 kg) | | 3.1 | 7.6 | 8.3 | 2.0 |

As is clear from Table 10, the compositions of Examples 19 and 20, which were prepared by using the block copolymers of Examples 1 and 2, have higher values of the tensile fracture elongation and the MFR than the composition of Comparative Example 14, which was prepared by using the block copolymer of Comparative Example 4, or the composition of Reference Example 5, which does not contain any block copolymer, and also, have a larger value of the tensile strength than the composition of Comparative Example 14. Further, it can be found that the compositions of Examples 19 and 20 have a larger value of tan δ in a temperature range of 0° C. to 40° C. than the composition of Comparative Example 14 or Reference Example 5, and thus exhibit a high vibration damping property in a wide temperature region from a low temperature to a relatively high temperature.

Examples 21, and 22, Comparative Example 15

Each of the block copolymers TPE-1, TPE-2, and TPE-7 was blended with an ABS resin at a mass ratio noted in Table 11 below, and melt-kneaded at 230° C. by using a twin-screw extruder to obtain a resin composition. As the ABS resin, "Techno ABS 110N" (manufactured by Techno-UMG Co., Ltd.) was used.

On the obtained composition, by the same procedure as described above in Example 12, the loss factor was measured at measurement temperatures of 0° C., 20° C., and 40° C.

The measurement results are noted in Table 11 below. For reference, Table 11 also illustrates measurement data in the case of only the ABS resin, in Reference Example 6.

As is clear from Table 11, it can be found that the compositions of Examples 21 and 22, which were prepared by using the block copolymers of Examples 1 and 2, have a higher loss factor value in a temperature range of 0° C. to 40° C. than the composition of Comparative Example 15, which was prepared by using the block copolymer of Comparative Example 4 or the composition of Reference Example 6, which does not contain any block copolymer, that is, than the composition of Comparative Example 15 or Reference Example 6, and thus exhibit a high vibration damping property in a wide temperature range from a low temperature to a relatively high temperature.

Examples 23 and 24, Comparative Example 16

Each of the block copolymers TPE-1, TPE-2, and TPE-7 was blended with nylon 6 at a mass ratio noted in Table 12 below, and melt-kneaded at 250° C. by using a twin-screw extruder to obtain a resin composition. As the nylon 6, "UBE nylon 1013B" (manufactured by UBE Industries, Ltd.) was used.

On the obtained composition, by the same procedure as described above in Example 12, the loss factor was measured at measurement temperatures of 0° C., 20° C., and 40° C.

The measurement results are noted in Table 12 below. For reference, Table 12 also illustrates measurement data in the case of only nylon 6, in Reference Example 7.

TABLE 11

| | | Reference Example 6 | Example 21 | Example 22 | Comparative Example 15 |
|---|---|---|---|---|---|
| Resin composition [part by mass] | ABS resin | 100 | 90 | 90 | 90 |
| | TPE-1 | — | 10 | — | — |
| | TPE-2 | — | — | 10 | — |
| | TPE-7 | — | — | — | 10 |
| Loss factor (0° C.) | | 0.006 | 0.019 | 0.011 | 0.008 |
| Loss factor (20° C.) | | 0.007 | 0.038 | 0.018 | 0.007 |
| Loss factor (40° C.) | | 0.010 | 0.027 | 0.045 | 0.011 |

TABLE 12

|  |  | Reference Example 7 | Example 23 | Example 24 | Comparative Example 16 |
|---|---|---|---|---|---|
| Resin composition [part by mass] | Nylon 6 | 100 | 90 | 90 | 90 |
|  | TPE-1 | — | 10 | — | — |
|  | TPE-2 | — | — | 10 | — |
|  | TPE-7 | — | — | — | 10 |
| Loss factor (0° C.) |  |  | 0.02 | 0.04 | 0.03 | 0.02 |
| Loss factor (20° C.) |  |  | 0.03 | 0.08 | 0.05 | 0.03 |
| Loss factor (40° C.) |  |  | 0.09 | 0.10 | 0.11 | 0.07 |

As is clear from Table 12, it can be found that the compositions of Examples 23 and 24, which were prepared by using the block copolymers of Examples 1 and 2, have a higher loss factor value in a temperature range of 0° C. to 40° C. than the composition of Comparative Example 16, which was prepared by using the block copolymer of Comparative Example 4, or the composition of Reference Example 7, which does not contain any block copolymer, and thus exhibit a high vibration damping property in a wide temperature range from a low temperature to a relatively high temperature.

Examples 25 and 26, Comparative Example 17

Each of the block copolymers TPE-1, TPE-2, and TPE-7 was blended with polybutylene terephthalate (PBT) at a mass ratio noted in Table 13 below, and melt-kneaded at 270° C. by using a twin-screw extruder to obtain a resin composition. As the PBT, "TORAYCON 1401X31" (manufactured by Toray Industries, Inc.) was used.

On the obtained composition, by the same procedure as described above in Example 12, the loss factor was measured at measurement temperatures of 0° C., 20° C., and 40° C.

The measurement results are noted in Table 13 below. For reference, Table 13 also illustrates measurement data in the case of only PBT, in Reference Example 8.

TABLE 13

|  |  | Reference Example 8 | Example 25 | Example 26 | Comparative Example 17 |
|---|---|---|---|---|---|
| Resin composition [part by mass] | PBT | 100 | 90 | 90 | 90 |
|  | TPE-1 | — | 10 | — | — |
|  | TPE-2 | — | — | 10 | — |
|  | TPE-7 | — | — | — | 10 |
| Loss factor (0° C.) |  | 0.0077 | 0.0180 | 0.0080 | 0.0092 |
| Loss factor (20° C.) |  | 0.0076 | 0.0440 | 0.0120 | 0.0073 |
| Loss factor (40° C.) |  | 0.0202 | 0.0290 | 0.0490 | 0.0168 |

As noted in Table 13, it can be found that the compositions of Examples 25 and 26, which were prepared by using the block copolymers of Examples 1 and 2, have a higher loss factor value in a temperature range of 20° C. to 40° C. than the composition of Comparative Example 17, which was prepared by using the block copolymer of Comparative Example 4, or the composition of Reference Example 8, which does not contain any block copolymer, and thus, exhibit a high vibration damping property in a temperature range from a normal temperature to a relatively high temperature. In particular, it can be found that the composition of Example 25 has a higher loss factor value even at 0° C. than the composition of Comparative Example 17 or the composition of Reference Example 8, and thus exhibits a high vibration damping property even at a low temperature.

Examples 27 and 28, Comparative Example 18

Each of the block copolymers TPE-1, TPE-2, and TPE-7 was blended with polycarbonate at a mass ratio noted in Table 14 below, and melt-kneaded at 280° C. by using a twin-screw extruder to obtain a resin composition. As the polycarbonate, "Iupilon S3000" (manufactured by Mitsubishi Engineering-Plastics Corporation) was used.

On the obtained composition, by the same procedure as described above in Example 12, the loss factor was measured at measurement temperatures of 0° C., 20° C., and 40° C.

The measurement results are noted in Table 14 below. For reference, Table 14 also illustrates measurement data in the case of only polycarbonate, in Reference Example 9.

TABLE 14

| | | Reference Example 9 | Example 27 | Example 28 | Comparative Example 18 |
|---|---|---|---|---|---|
| Resin composition [part by mass] | Polycarbonate | 100 | 90 | 90 | 90 |
| | TPE-1 | — | 10 | — | — |
| | TPE-2 | — | — | 10 | — |
| | TPE-7 | — | — | — | 10 |
| Loss factor (0° C.) | | 0.013 | 0.020 | 0.013 | 0.013 |
| Loss factor (20° C.) | | 0.008 | 0.038 | 0.021 | 0.008 |
| Loss factor (40° C.) | | 0.006 | 0.019 | 0.031 | 0.006 |

As noted in Table 14, it can be found that the compositions of Examples 27 and 28, which were prepared by using the block copolymers of Examples 1 and 2, have the same or higher loss factor value in a temperature range of 0° C. to 40° C. than the composition of Comparative Example 18, which was prepared by using the block copolymer of Comparative Example 4, or the composition of Reference Example 9, which does not contain any block copolymer, and thus, exhibit a high vibration damping property in a wide temperature range from a low temperature to a relatively high temperature.

Examples 29 and 30, Comparative Example 19

Each of the block copolymers TPE-1, TPE-2, and TPE-7 was blended with polyacetal (POM) at a mass ratio noted in Table 15 below, and melt-kneaded at 200° C. by using a twin-screw extruder to obtain a resin composition. As the polyacetal, "DURACON M90-44" (manufactured by Polyplastics Co., Ltd.) was used.

On the obtained composition, by the same procedure as described above in Example 12, the loss factor was measured at measurement temperatures of 0° C., 20° C., 40° C., 60° C., 80° C., and 100° C.

The measurement results are noted in Table 15 below. For reference, Table 15 also illustrates measurement data in the case of only POM, in Reference Example 10.

TABLE 15

| | | Reference Example 10 | Example 29 | Example 30 | Comparative Example 19 |
|---|---|---|---|---|---|
| Resin composition [part by mass] | POM | 100 | 90 | 90 | 90 |
| | TPE-1 | — | 10 | — | — |
| | TPE-2 | — | — | 10 | — |
| | TPE-7 | — | — | — | 10 |
| Loss factor (0° C.) | | 0.017 | 0.023 | 0.017 | 0.019 |
| Loss factor (20° C.) | | 0.018 | 0.075 | 0.020 | 0.019 |
| Loss factor (40° C.) | | 0.019 | 0.019 | 0.087 | 0.021 |
| Loss factor (60° C.) | | 0.023 | 0.025 | 0.026 | 0.021 |
| Loss factor (80° C.) | | 0.021 | 0.029 | 0.028 | 0.022 |
| Loss factor (100° C.) | | 0.025 | 0.039 | 0.041 | 0.026 |

As noted in Table 15, it can be found that the compositions of Examples 29 and 30, which were prepared by using the block copolymers of Examples 1 and 2 have the same or higher loss factor value in a temperature range of 0° C. to 100° C. than the composition of Comparative Example 19, which was prepared by using the block copolymer of Comparative Example 4, or the composition of Reference Example 10, which does not contain any block copolymer, and thus exhibit a high vibration damping property in a wide temperature range from a low temperature to a high temperature.

Examples 31 and 32, Comparative Example 20

Each of the block copolymers TPE-1, TPE-2, and TPE-7 was blended with polyphenylene ether (PPE) and polystyrene at a mass ratio noted in Table 16 below, and melt-kneaded at 250° C. by using a twin-screw extruder to obtain a resin composition. As the PPE, "NORYL640" (manufactured by SABIC) was used. As the polystyrene, "TOYO STYROL G210C" (manufactured by TOYO-STYRENE Co., Ltd.) was used.

On the obtained composition, by the same procedure as described above in Example 12, the loss factor was measured at measurement temperatures of 0° C., 20° C., 40° C., 60° C., 80° C., and 100° C.

The measurement results are noted in Table 16 below. For reference, Table 16 also illustrates measurement data in the case of only PPE and polystyrene, in Reference Example 11.

TABLE 16

|  |  | Reference Example 11 | Example 31 | Example 32 | Comparative Example 20 |
|---|---|---|---|---|---|
| Resin composition [part by mass] | PPE | 50 | 45 | 45 | 45 |
|  | Polystyrene | 50 | 45 | 45 | 45 |
|  | TPE-1 | — | 10 | — | — |
|  | TPE-2 | — | — | 10 | — |
|  | TPE-7 | — | — | — | 10 |
| Loss factor (0° C.) |  | 0.006 | 0.025 | 0.008 | 0.019 |
| Loss factor (20° C.) |  | 0.007 | 0.051 | 0.022 | 0.013 |
| Loss factor (40° C) |  | 0.010 | 0.025 | 0.0411 | 0.013 |
| Loss factor (60° C.) |  | 0.013 | 0.018 | 0.051 | 0.016 |
| Loss factor (80° C.) |  | 0.017 | 0.048 | 0.046 | 0.020 |
| Loss factor (100° C.) |  | 0.021 | 0.041 | 0.045 | 0.025 |

As is clear from Table 16, it can be found that the compositions of Examples 31 and 32, which were prepared by using the block copolymers of Examples 1 and 2, have a higher loss factor value in a temperature range of 20° C. to 100° C. than the composition of Comparative Example 20, which was prepared by using the block copolymer of Comparative Example 4, or the composition of Reference Example 11, which does not contain any block copolymer, and thus exhibit a high vibration damping property in a wide temperature range from a normal temperature to a high temperature. In particular, it can be found that the composition of Example 31 has a higher loss factor value even at 0° C. than the composition of Comparative Example 20 or the composition of Reference Example 11, and thus exhibits a high vibration damping property even at a low temperature.

Examples 33 and 34, Comparative Example 21

Each of the block copolymers TPE-1, TPE-2, and TPE-7 was blended with nylon 6, PPE, and maleic anhydride at a mass ratio noted in Table 17 below, and melt-kneaded at 270° C. by using a twin-screw extruder to obtain a resin composition. As the nylon 6, "UBE nylon 1013B" (manufactured by UBE Industries, Ltd.) was used. As the PPE, "NORYL640" (manufactured by SABIC) was used.

On the obtained composition, by the same procedure as described above in Example 12, the loss factor was measured at measurement temperatures of 0° C., 20° C., and 40° C.

The measurement results are noted in Table 17 below. For reference, Table 17 also illustrates measurement data of a composition prepared by using only nylon 6, PPE, and maleic anhydride, in Reference Example 12.

As is clear from Table 17, it can be found that the compositions of Examples 33 and 34, which were prepared by using the block copolymers of Examples 1 and 2, have a higher loss factor value in a temperature range of 20° C. to 40° C. than the composition of Comparative Example 21, which was prepared by using the block copolymer of Comparative Example 4, or the composition of Reference Example 12, which does not contain any block copolymer, and thus, exhibit a high vibration damping property in a temperature range from a normal temperature to a relatively high temperature. In particular, it can be found that the composition of Example 33 has a higher loss factor value even at 0° C. than the composition of Comparative Example 21 or the composition of Reference Example 12, and thus exhibits a high vibration damping property even at a low temperature.

Examples 35 and 36, Comparative Example 22

Each of the block copolymers TPE-1, TPE-2, and TPE-7 was blended with polyphenylene sulfide (PPS) at a mass ratio noted in Table 18 below, and melt-kneaded at 300° C. by using a twin-screw extruder to obtain a resin composition. As the PPS, "TORELINA A900" (manufactured by Toray Industries, Inc.) was used.

On the obtained composition, by the same procedure as described above in Example 12, the loss factor was measured at measurement temperatures of 0° C., 20° C., 40° C., and 60° C.

The measurement results are noted in Table 18 below. For reference, Table 18 also illustrates measurement data in the case of only PPS, in Reference Example 13.

TABLE 17

|  |  | Reference Example 12 | Example 33 | Example 34 | Comparative Example 21 |
|---|---|---|---|---|---|
| Resin composition [part by mass] | Nylon 6 | 50 | 45 | 45 | 45 |
|  | PPE | 50 | 45 | 45 | 45 |
|  | TPE-1 | — | 10 | — | — |
|  | TPE-2 | — | — | 10 | — |
|  | TPE-7 | — | — | — | 10 |
|  | Maleic anhydride | 0.5 | 0.5 | 0.5 | 0.5 |
| Loss factor (0° C.) |  | 0.010 | 0.029 | 0.010 | 0.013 |
| Loss factor (20° C.) |  | 0.010 | 0.051 | 0.023 | 0.011 |
| Loss factor (40° C.) |  | 0.013 | 0.023 | 0.043 | 0.012 |

TABLE 18

| | | Reference Example 13 | Example 35 | Example 36 | Comparative Example 22 |
|---|---|---|---|---|---|
| Resin composition [part by mass] | PPS | 100 | 90 | 90 | 90 |
| | TPE-1 | — | 10 | — | — |
| | TPE-2 | — | — | 10 | — |
| | TPE-7 | — | — | — | 10 |
| Loss factor (0° C.) | | 0.008 | 0.011 | 0.025 | 0.008 |
| Loss factor (20° C.) | | 0.008 | 0.015 | 0.035 | 0.007 |
| Loss factor (40° C.) | | 0.006 | 0.024 | 0.030 | 0.006 |
| Loss factor (60° C.) | | 0.007 | 0.018 | 0.027 | 0.007 |

As noted in Table 18, it can be found that the compositions of Examples 35 and 36, which were prepared by using the block copolymers of Examples 1 and 2, have a higher loss factor value in a temperature range of 0° C. to 60° C. than the composition of Comparative Example 22, which was prepared by using the block copolymer of Comparative Example 4, or the composition of Reference Example 13, which does not contain any block copolymer, and thus, exhibit a high vibration damping property in a wide temperature range from a low temperature to a high temperature.

Examples 39 to 43, Comparative Example 23

Each of the block copolymers TPE-7, TPE-8, and TPE-9 was blended with hydrogenated paraffin oil and a polyolefin resin at a mass ratio noted in Table 19 below, and melt-kneaded at 200° C. by using a twin-screw extruder to obtain a hydrogenated block copolymer composition. As the hydrogenated paraffin oil, "Diana process oil PW-32" (kinematic viscosity at 40° C.: 31 mm²/s, manufactured by Idemitsu Kosan Co., Ltd.) was used, and as the polyolefin resin, "Prime Polypro F327" (melt flow rate (MFR) [230° C., load of 2.16 kg (21 N)]=7 g/10 min, manufactured by Prime Polymer Co., Ltd.) was used.

On the obtained composition, the intensity of tan δ in a shear mode at 0° C., 20° C., and 40° C. was measured in the same manner as in Example 8. Also, the compressed permanent distortion at 70° C., 100° C., and 120° C. was measured by the following method. The obtained composition was compression-molded at 200° C. for 3 min by a compression molding machine to prepare a columnar test piece with a diameter of 13.0±0.5 mm, and a thickness of 6.3±0.3 mm. Then, by using the columnar test piece, 25% compression deformation was maintained for 22 h at each of the temperatures in accordance with JIS K6262, and then, the compressed permanent distortion was measured. The smaller this value, the more excellent the compressed permanent distortion at a high temperature. The obtained intensity of tan δ and the measurement results on the compressed permanent distortion are noted in Table 19 below.

As is clear from Table 19, the compositions of Examples 39 to 43, which were prepared by using the block copolymer (TPE-8 or TPE-9) of Example 37 or 38, exhibit a higher tan δ at 0 to 40° C. than the composition of Comparative Example 23, which was prepared by using the block copolymer (TPE-7) of Comparative Example 4. In the compositions of Examples 39 to 43, the compressed permanent distortion value at each of 70° C., 100° C., and 120° C. was 60% or less. Further, this compressed permanent distortion value is preferably 65% or less, more preferably 60% or less, further preferably 55% or less in the above temperature range. It can be found that since the compressed permanent distortion falls within a preferable range, the molded body made of the composition of Example is excellent in a compressed permanent distortion resistance at a high temperature.

TABLE 19

| | | Example 39 | Example 40 | Example 41 | Example 42 | Example 43 | Comparative Example 23 |
|---|---|---|---|---|---|---|---|
| Resin composition [part by mass] | TPE-8 | 45 | 40 | 40 | 25 | — | — |
| | TPE-9 | — | — | — | — | 40 | — |
| | TPE-7 | — | — | — | — | — | 40 |
| | Hydrogenated paraffin oil | 45 | 40 | 20 | 63 | 20 | 40 |
| | Polyolefin resin | 10 | 20 | 40 | 12 | 40 | 20 |
| tan δ (shear mode, 1 Hz) | 0° C. | 0.4 | 0.4 | 0.5 | 1.1 | 0.3 | 0.04 |
| | 20° C. | 1.8 | 1.6 | 1.7 | 0.8 | 0.6 | 0.03 |
| | 40° C. | 0.4 | 0.3 | 0.3 | 0.2 | 1.4 | 0.05 |
| Compressed permanent distortion (%) | 70° C. | 25 | 35 | 54 | 25 | 38 | 85 |
| | 100°C. | 44 | 48 | 55 | 43 | 50 | 98 |
| | 120° C. | 46 | 49 | 57 | 50 | 52 | 100 |

INDUSTRIAL APPLICABILITY

The block copolymer and the resin composition of the present invention are useful as a vibration damping material, a sound insulating material, a shoe sole material, a flooring material, a gear, a gearbox, a vibration damping paint, an adhesive, a direct glazing adhesive or sticking agent for automobiles, etc. Further, examples of the automobile parts include cooling parts such as a thermostat housing, a radiator tank, a radiator hose, a water outlet, a water pump housing, and a rear joint; intake/exhaust system parts such as an intercooler tank, an intercooler case, a turbo duct pipe, an EGR cooler case, a resonator, a throttle body, an intake manifold, and a tail pipe; fuel system parts such as a fuel delivery pipe, a gasoline tank, a quick connector, a canister, a pump module, a fuel pipe, an oil strainer, a lock nut, and a sealing material; structural parts such as a mount bracket, a torque rod, and a cylinder head cover; drive system parts such as a bearing retainer, a gear tensioner, a head lamp actuator gear, an HVAC gear, a sliding door roller, and a clutch peripheral part; brake system parts such as an air brake tube; in-vehicle electrical parts such as a wire harness connector within an engine room, a motor part, a sensor, an ABS bobbin, a combination switch, an in-vehicle switch, and an electronic control unit (ECU) box; and interior/exterior parts such as a sliding door damper, a door mirror stay, a door mirror bracket, an inner mirror stay, a roof rail, an engine mount bracket, an inlet pipe of an air cleaner, a door checker, a plastic chain, an emblem, a clip, a breaker cover, a cup holder, an airbag, a fender, a spoiler, a radiator support, a radiator grill, a louver, an air scoop, a hood bulge, a back door, a fuel sender module, a floor mat, an instrument panel, a dashboard, a dash insulator, dam rubber, a weather strip, and a tire.

In addition, they are also useful as an adhesive or a sticking agent, a sealing material, a packing, an O ring, a belt, a sound proofing material, and the like, in various electrical products in the field of home appliances, such as TVs, various recorders such as Blu-ray recorders or HDD recorders, projectors, game machines, digital cameras, home videos, antennas, speakers, electronic dictionaries, IC recorders, FAX machines, copy machines, telephones, doorphones, rice cookers, microwave ovens, oven ranges, refrigerators, dishwashers, dish dryers, IH cooking heaters, hot plates, vacuum cleaners, washing machines, chargers, sewing machines, irons, dryers, electric bicycles, air purifiers, water purifiers, electric toothbrushes, lighting equipment, air conditioners, outdoor units of the air-conditioners, dehumidifiers, and humidifiers.

REFERENCE SIGNS LIST

11: restraining plate
12: base material
13: vibration damping material
22: base material
23: vibration damping material
100: laminate as restraint type vibration damping material
200: laminate as non-restraint type vibration damping material

The invention claimed is:
1. A block copolymer comprising:
a first polymer block containing more than 70 mol % of a structural unit derived from an aromatic vinyl compound, and
a second polymer block containing 30 mol % or more of a structural unit derived from a conjugated diene compound,
wherein the conjugated diene compound comprises isoprene,
wherein the block copolymer is a hydrogenated product, and a hydrogenation rate of the second polymer block is 60 mol % or more,
the hydrogenated block copolymer comprises 5 ppm by mass or more of 2,2-di(2-tetrahydrofuryl)propane (DTHFP), and
wherein the block copolymer satisfies following conditions:
Condition (1): a content of the first polymer block in the block copolymer is from 1 to 70% by mass;
Condition (2): a maximum width of a series of temperature regions where tan δ measured in accordance with JIS K7244-10 (2005), under conditions including a strain amount of 0.1%, a frequency of 1 Hz, a measurement temperature of −70 to 100° C., and a temperature rise rate of 3° C./min, is 1.0 or more is less than 16° C.;
Condition (3): a temperature at a peak position of tan δ in the condition (2) falls within a range of 0° C. to +50° C.; and
Condition (4): a mobility parameter M indicating a mobility of the second polymer block falls within a range of from 0.01 to 0.25 sec, which is obtained through the following equation [II] by using coefficients $A_1$ to $A_3$ and spin-spin relaxation times $\tau_1$ to $\tau_3$ of components which are determined by performing fitting of the following equation [I], in regard to a relaxation curve which is represented by a relaxation intensity y with respect to a relaxation time x, and measured using a pulse NMR apparatus:

$$y = A_1 * \exp(-0.5*(x/\tau_1)^2) + A_2 * \exp(-0.5(x/\tau_2)^2) + A_3 * \exp(-x/\tau_3) \quad [I], \text{ and}$$

$$M = (\tau_2 * A_2 + \tau_3 * A_3)/(A_2 + A_3) \quad [II].$$

2. The block copolymer according to claim 1, wherein a sum of a content of 1,2-bond units and a content of 3,4-bond units in the structural unit derived from the conjugated diene compound is 60 mol % or more.

3. The block copolymer according to claim 1, wherein the second polymer block does not contain a structural unit derived from an aromatic vinyl corn pound.

4. The block copolymer according to claim 1, wherein the block copolymer comprises the first polymer block in an amount of from 15 to 65% by mass.

5. The block copolymer according to claim 1, wherein a loss modulus G" at 10° C. or 30° C., which is measured in accordance with JIS K7244-10 (2005) under conditions including a strain amount of 0.1%, a frequency of 1 Hz, a measurement temperature of from −70 to 100° C., and a temperature rise rate of 3° C./min, is $7.0 \times 10^6$ Pa or more.

6. A resin composition, comprising
the block copolymer according to claim 1, and
one or more compound selected from a polyolefin-based resin, a styrene-based resin, polyphenylene ether, an isobutylene-isoprene copolymer rubber, a polyurethane-based thermoplastic elastomer, polycarbonate, and polyamide,
wherein a content ratio of the block copolymer component and the the one or more compound c is from 1/99 to 99/1 by a mass ratio.

7. A molded body obtained by molding the block copolymer according to claim 1.

8. A vibration damping material comprising the block copolymer according to claim 1.

9. A sound insulating material comprising the block copolymer according to claim 1.

10. A shoe sole material comprising the block copolymer according to claim 1.

11. A flooring material comprising the block copolymer according to claim 1.

12. An adhesive or a sticking agent comprising the block copolymer according to claim 1.

13. A laminate comprising an X layer comprising the block copolymer according to claim 1, and a Y layer laminated on one side surface of the X layer.

14. The block copolymer according to claim 1, wherein the conjugated diene compound comprises 30 mol % or more of isoprene.

* * * * *